United States Patent
Richman et al.

(10) Patent No.: US 11,083,126 B2
(45) Date of Patent: Aug. 10, 2021

(54) SEED QUILTS

(71) Applicant: Hamama, Inc., San Francisco, CA (US)

(72) Inventors: Camille Elyse Richman, San Francisco, CA (US); Daniel Hayim Goodman, San Francisco, CA (US)

(73) Assignee: Hamama, Inc., West Sacramento, CA (US)

( * ) Notice: Subject to any disclaimer, the term of this patent is extended or adjusted under 35 U.S.C. 154(b) by 316 days.

(21) Appl. No.: 15/702,712

(22) Filed: Sep. 12, 2017

(65) Prior Publication Data

US 2018/0070528 A1 Mar. 15, 2018

Related U.S. Application Data

(60) Provisional application No. 62/517,176, filed on Jun. 9, 2017, provisional application No. 62/426,498, filed on Nov. 26, 2016, provisional application No. 62/424,383, filed on Nov. 18, 2016, provisional application No. 62/401,861, filed on Sep. 29, 2016, provisional application No. 62/393,566, filed on Sep. 12, 2016.

(51) Int. Cl.
| | |
|---|---|
| *A01C 1/04* | (2006.01) |
| *A01G 31/00* | (2018.01) |
| *A01G 9/029* | (2018.01) |

(52) U.S. Cl.
CPC .......... *A01C 1/044* (2013.01); *A01G 9/0293* (2018.02); *A01G 31/00* (2013.01)

(58) Field of Classification Search
CPC ...... A01G 9/029; A01G 9/0293; A01G 9/033; A01G 31/00; A01G 31/02; A01G 31/06; A01C 1/044; A01C 1/04; A01C 1/00
See application file for complete search history.

(56) References Cited

U.S. PATENT DOCUMENTS

| | | | | |
|---|---|---|---|---|
| 1,160,279 | A * | 11/1915 | Gray ...................... | A01C 1/044 47/56 |
| 2,309,702 | A * | 2/1943 | Kirschenbaum ....... | A01C 1/044 47/56 |
| 2,323,746 | A * | 7/1943 | Woolf .................... | A01C 1/046 47/56 |
| 2,648,165 | A * | 8/1953 | Nestor ................... | A01C 1/044 47/56 |

(Continued)

FOREIGN PATENT DOCUMENTS

| | | | | |
|---|---|---|---|---|
| BE | 428039 A | * | 6/1938 | ............. A01C 1/044 |
| CA | WO-9856232 A1 | * | 12/1998 | ............. A01G 20/20 |

(Continued)

OTHER PUBLICATIONS

PCT/US2017/051233, International Search Report and Written Opinion, Dated Nov. 13, 2017.

(Continued)

*Primary Examiner* — Kathleen I Alker
(74) *Attorney, Agent, or Firm* — Rimon Law, P.C.

(57) ABSTRACT

A quilted composite sheet containing seeds makes growing microgreens and other crops simple. Each sheet is a layered composite of multiple materials including seed, grow substrate and seed cover. A user can spread a seed quilt over the surface to be planted, water, wait, and harvest.

20 Claims, 23 Drawing Sheets

(56) References Cited

U.S. PATENT DOCUMENTS

| | | | |
|---|---|---|---|
| 2,826,865 A * | 3/1958 | Chohamin | A01G 20/00 47/56 |
| 2,931,140 A | 4/1960 | Laffier et al. | |
| 2,976,646 A * | 3/1961 | Hansenpaule | A01G 20/00 47/56 |
| 3,080,681 A * | 3/1963 | Merrill | A01G 20/00 47/56 |
| 3,304,653 A | 2/1967 | Zadarnowski | |
| 3,659,396 A * | 5/1972 | Baker | B65B 9/023 53/546 |
| 4,106,235 A | 8/1978 | Smith | |
| 4,309,844 A * | 1/1982 | King | A01C 1/044 47/56 |
| 4,392,328 A | 7/1983 | Walker | |
| 4,407,092 A | 10/1983 | Ware | |
| 4,941,282 A | 7/1990 | Milstein | |
| 5,073,401 A * | 12/1991 | Mohr | A01G 31/042 426/138 |
| 5,193,306 A | 3/1993 | Whisenant | |
| 5,210,975 A * | 5/1993 | Beckerman | A01G 9/029 47/56 |
| 5,802,763 A * | 9/1998 | Milstein | A01G 20/20 47/56 |
| 5,849,645 A | 12/1998 | Lancaster | |
| 5,860,245 A * | 1/1999 | Welch | A01C 1/044 47/56 |
| 5,866,269 A * | 2/1999 | Dalebroux | A01G 13/0275 428/139 |
| 5,887,382 A | 3/1999 | Marshall et al. | |
| 5,974,735 A * | 11/1999 | Behrens | E04D 11/002 47/58.1 R |
| 6,070,358 A * | 6/2000 | Meikle | A01G 20/00 47/56 |
| 6,389,745 B1 * | 5/2002 | Huh | A01C 1/044 47/1.01 F |
| 6,446,386 B1 * | 9/2002 | Holloway | A01C 1/044 47/56 |
| 6,578,317 B1 * | 6/2003 | Ahm | A01C 1/042 47/56 |
| 6,681,521 B1 * | 1/2004 | Holloway | A01C 1/042 47/56 |
| 6,735,902 B1 * | 5/2004 | Ahm | A01C 1/042 47/56 |
| 7,356,964 B2 * | 4/2008 | Ahm | A01C 1/042 47/56 |
| 7,614,181 B2 * | 11/2009 | Ahm | A01C 1/042 47/56 |
| 7,698,854 B2 * | 4/2010 | Holloway | A01C 1/044 47/56 |
| 9,885,140 B2 * | 2/2018 | Tietz | D06F 39/10 |
| 2002/0018875 A1 | 2/2002 | Weder | |
| 2004/0060677 A1 * | 4/2004 | Huang | A01C 1/044 162/158 |
| 2004/0098270 A1 | 5/2004 | Obayashi et al. | |
| 2005/0028440 A1 * | 2/2005 | Ko | A01C 1/044 47/56 |
| 2006/0053691 A1 | 3/2006 | Harwood et al. | |
| 2007/0144068 A1 | 6/2007 | Feng | |
| 2012/0036772 A1 * | 2/2012 | Kennedy | A01C 1/044 47/56 |
| 2012/0277117 A1 | 11/2012 | Zayed et al. | |
| 2013/0269248 A1 * | 10/2013 | Kennedy | A01G 9/0291 47/56 |
| 2013/0340334 A1 | 12/2013 | Huang et al. | |
| 2014/0290133 A1 * | 10/2014 | Seacord | A01C 1/044 47/56 |
| 2015/0257330 A1 * | 9/2015 | Remme | A01C 1/042 47/56 |
| 2016/0198621 A1 * | 7/2016 | Ohlund | A01C 1/02 47/19.1 |
| 2016/0262317 A1 * | 9/2016 | Scott-Harden | A01G 9/0293 |
| 2017/0172082 A1 | 6/2017 | Weiss et al. | |

FOREIGN PATENT DOCUMENTS

| | | | | |
|---|---|---|---|---|
| DE | 2158914 A1 * | 7/1972 | | D04H 1/00 |
| DE | 4110385 A1 * | 10/1992 | | A01C 1/044 |
| EP | 0201087 A2 * | 11/1986 | | A01C 1/044 |
| EP | WO-9607309 A1 * | 3/1996 | | A01G 20/20 |
| EP | 0887003 A1 | 12/1998 | | |
| EP | 2944185 A1 | 11/2015 | | |
| FR | 2505607 A * | 11/1982 | | A01C 1/04 |
| FR | 2538993 A1 | 7/1984 | | |
| FR | 2569329 A1 * | 2/1986 | | A01C 1/042 |
| GB | 1122402 A * | 8/1968 | | A01C 1/044 |
| GB | 1253456 A * | 11/1971 | | A01C 1/044 |
| GB | 2123663 A * | 2/1984 | | A01C 1/044 |
| GB | 2191925 A * | 12/1987 | | A01C 1/042 |
| GB | 2197774 A * | 6/1988 | | A01C 1/042 |
| JP | 01171403 A * | 7/1989 | | A01C 1/04 |
| JP | 03180106 A * | 8/1991 | | A01C 1/04 |
| JP | 03290525 A * | 12/1991 | | E02D 17/20 |
| JP | 04047026 A * | 2/1992 | | E02D 17/20 |
| JP | 05091807 A * | 4/1993 | | A01C 1/04 |
| JP | 05284810 A * | 11/1993 | | A01C 1/04 |
| JP | 05292805 A * | 11/1993 | | A01C 1/04 |
| JP | 06054605 A * | 3/1994 | | A01C 1/04 |
| WO | WO-9700003 A1 * | 1/1997 | | A01C 1/044 |
| WO | 2004098270 A1 | 11/2004 | | |
| WO | 2012/033259 A1 | 3/2012 | | |
| WO | 2015022782 A1 | 2/2015 | | |
| WO | 2015052889 A1 | 4/2015 | | |
| WO | 2015128911 A1 | 9/2015 | | |

OTHER PUBLICATIONS

U.S. Appl. No. 15/382,247, Office Action dated Jun. 1, 2017.
EP17849796.2, Extended European Search Report, dated Mar. 26, 2020.

\* cited by examiner

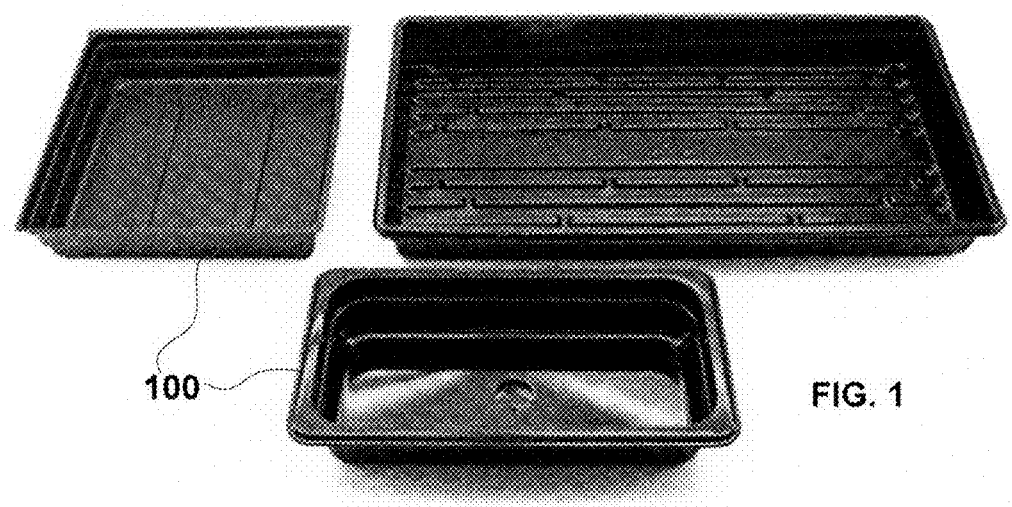
100    FIG. 1
FIG. 2A    200
FIG. 2B    200
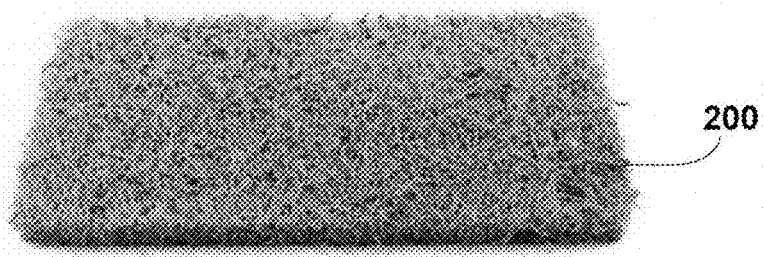
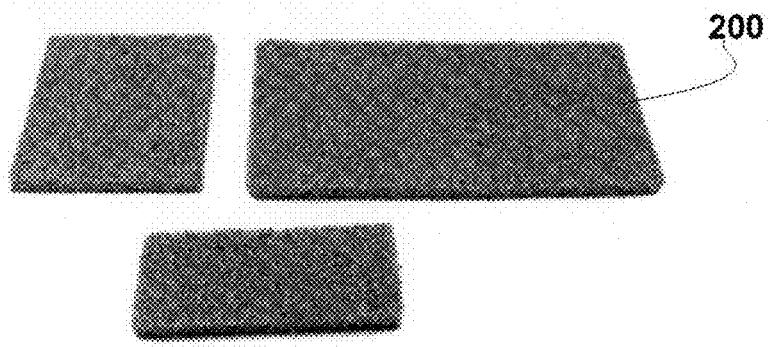

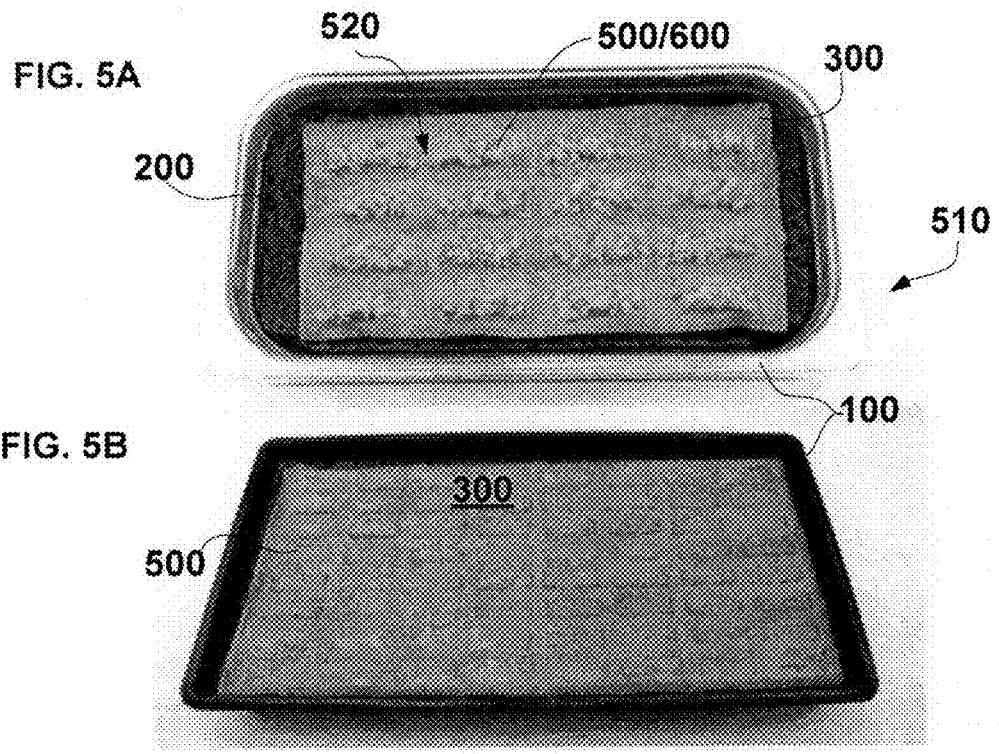
FIG. 5A
FIG. 5B
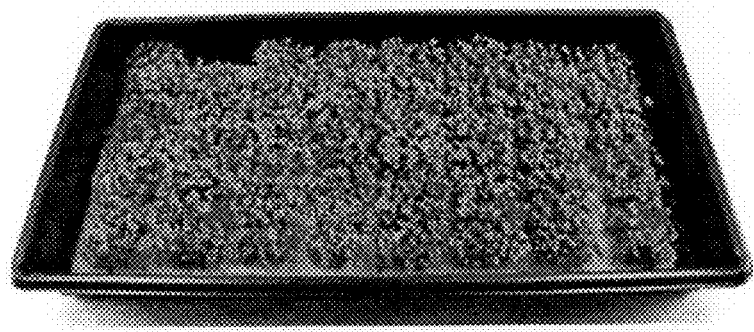
FIG. 6A
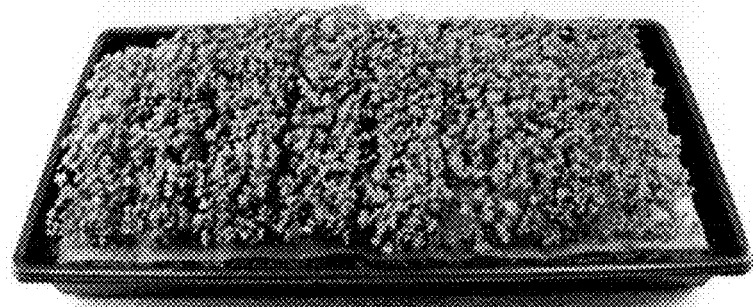
FIG. 6B

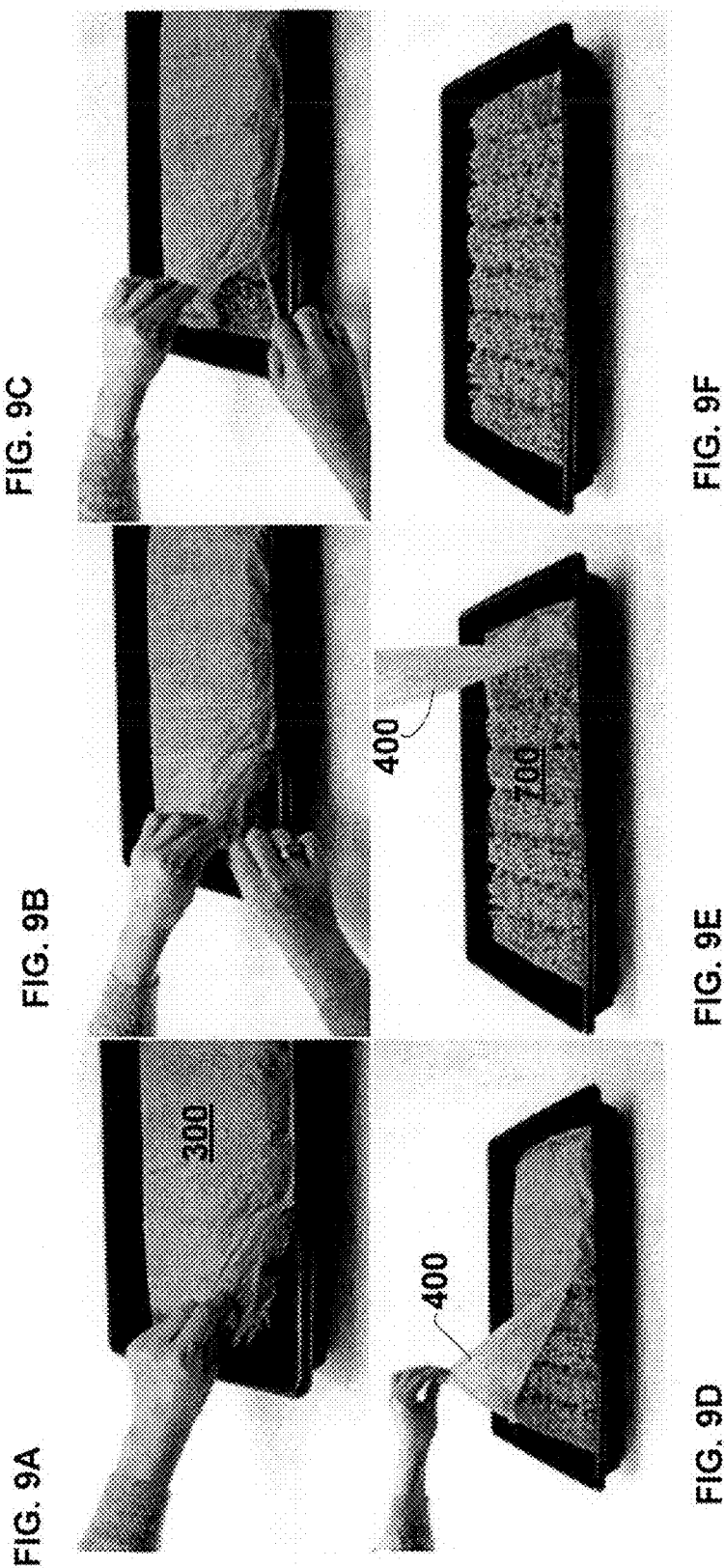

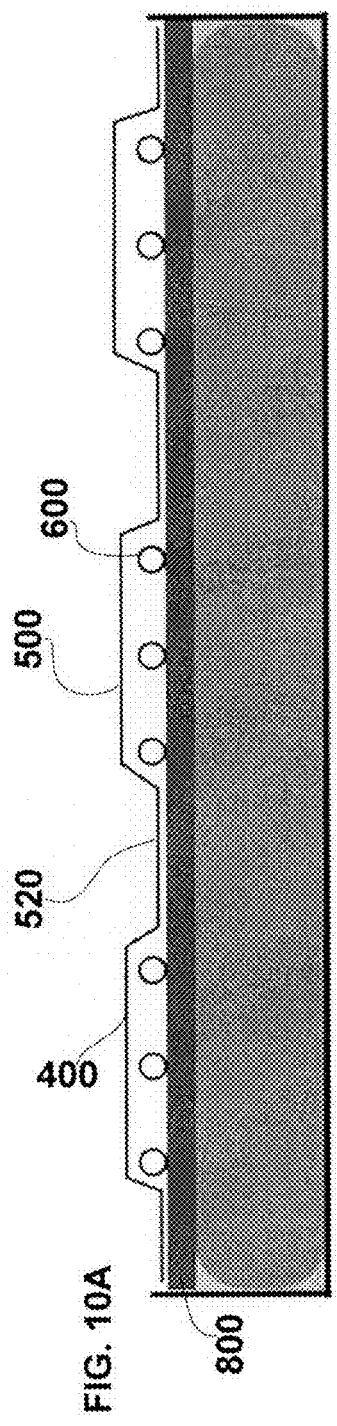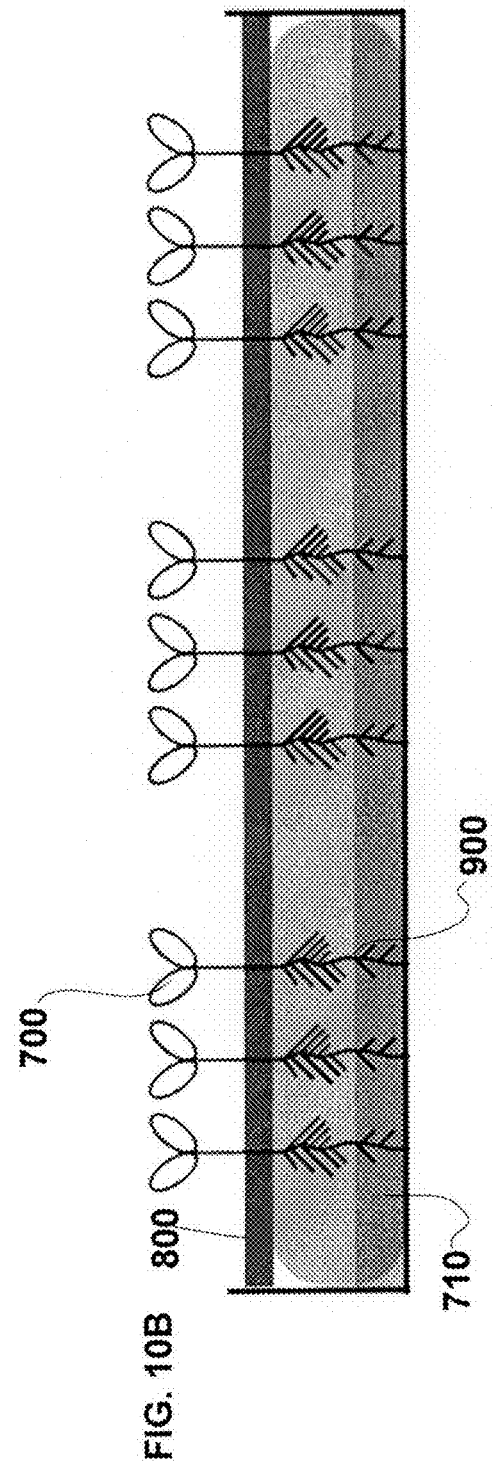

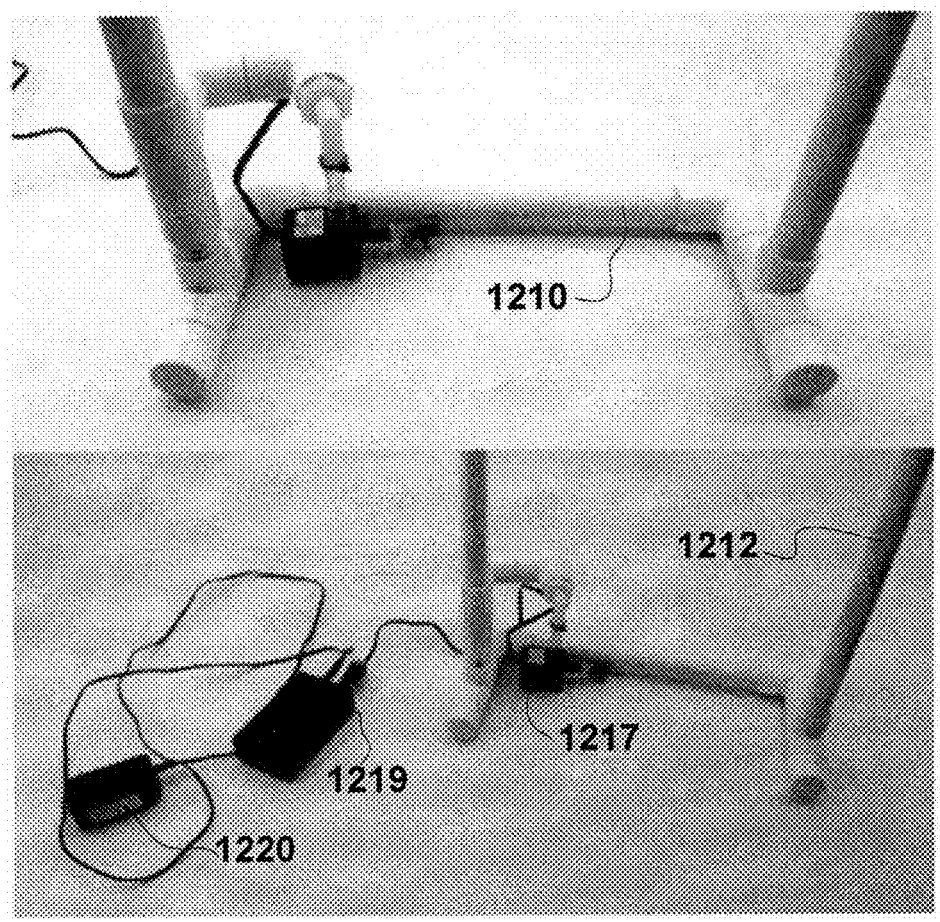

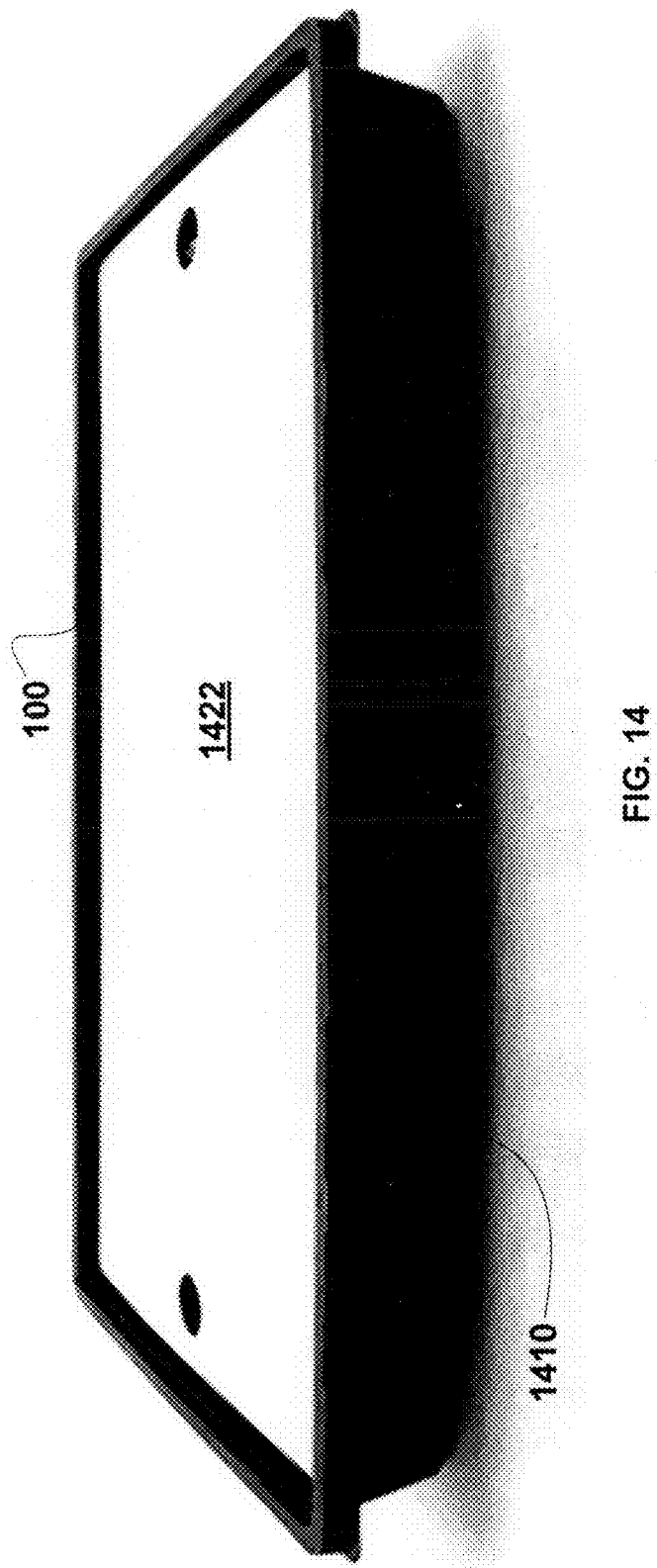

SEED QUILTS

CROSS-REFERENCE TO RELATED APPLICATIONS

This application claims benefit of and priority to the following U.S. Provisional Patent Applications: 62/393,566 filed Sep. 12, 2016; 62/401,861 filed Sep. 29, 2016; 62/424,383 filed Nov. 18, 2016; 62/426,498 filed Nov. 26, 2016; and 62/517,176 filed Jun. 9, 2017. The disclosures of these provisional patent applications are hereby incorporated herein by reference.

SUMMARY

Systems and methods of growing plants from seeds include the use of composite sheets to retain and distribute seeds during germination. These composite sheets are referred to herein as "seed quilts." The seed quilts may be used to grow seeds in a tray-based system having standing water or in a hydroponic system including flowing water. For example, the seed quilts may be used in a tray of appropriate dimensions, a vertical growing system with plumbing configured at steep angles up to 90° or consisting of stacked horizontal levels, or a growing system comprised of complex surfaces. The seed quilts may be used in soil-based applications if suitable watering and drainage practices are used.

The seed quilts include at least two sheets of material. These sheets represent different layers and are bonded together at selected locations in order to produce a plurality of pockets between the sheets. Prior to bonding, seeds are placed in the locations of these pockets. As such each pocket when completed includes a predetermined exact or approximate number of seeds depending on the application. The seeds are held within the pockets by the bonding process. A desired distribution of seeds across the entire seed quilt is thus obtained. The size of each of the pockets is selected such that the volume between the sheets can expand a desired amount during the sprouting process. These pockets are referred to herein as "seed cells." In various embodiments, the seed quilts provide a number of advantages, such as reduced cost, consistent and appropriate distribution of seeds, humidity and moisture control, pathogen mitigation, waste mitigation, easy planting and harvesting, light control, and the ability to germinate and grow horizontally, vertically, and at other non-horizontal angles.

Various embodiments of the invention include a seed quilt comprising: a grow substrate; optionally seeds; a seed cover; and bonding regions at which the grow substrate is attached to the seed cover and configured to form one or more seed cells in which one or more seeds are contained, the seed cells having sufficient space for the seeds to germinate and sprout.

Various embodiments of the invention include a kit comprising: a seed quilt a grow tray; a fiber mat; and a spacer. Various embodiments of the invention include a method of making a seed quilt, the method comprising: receiving a grow substrate; adding seeds to the grow substrate; covering the seeds with a seed cover; and bonding the grow substrate to the seed cover to create seed cells in which the seeds are confined.

BRIEF DESCRIPTION OF THE DRAWINGS

FIG. 1 is a view of three different sizes of grow trays that could be used to grow plants from differently sized seed quilts, according to various embodiments of the invention.

FIGS. 2a and 2b include views of various sizes of coconut fiber mats that may be used in conjunction with the grow trays in FIG. 1, according to various embodiments of the invention.

FIGS. 5a and 5b include views of two different sized grow trays containing correspondingly sized coconut fiber mats and correspondingly sized seed quilts, according to various embodiments of the invention.

FIGS. 6a and 6b include a comparison of a grow tray growing plants from a seed quilt without the use of a coconut fiber mat and a grow tray growing a seed quilt with the use of a coconut fiber mat, according to various embodiments of the invention.

FIGS. 9a-9f illustrate removal of a seed cover from a seed quilt, according to various embodiments of the invention.

FIGS. 10a-10b represent a cross-sectional view of a grow tray system using a coconut fiber mat, according to various embodiments of the invention.

FIGS. 12a-12b include detailed views of part of the vertical growing system illustrated in FIGS. 11a-11b, according to various embodiments of the invention.

FIG. 14 illustrates a seed growing kit, according to various embodiments of the invention.

DETAILED DESCRIPTION

Figure 3:
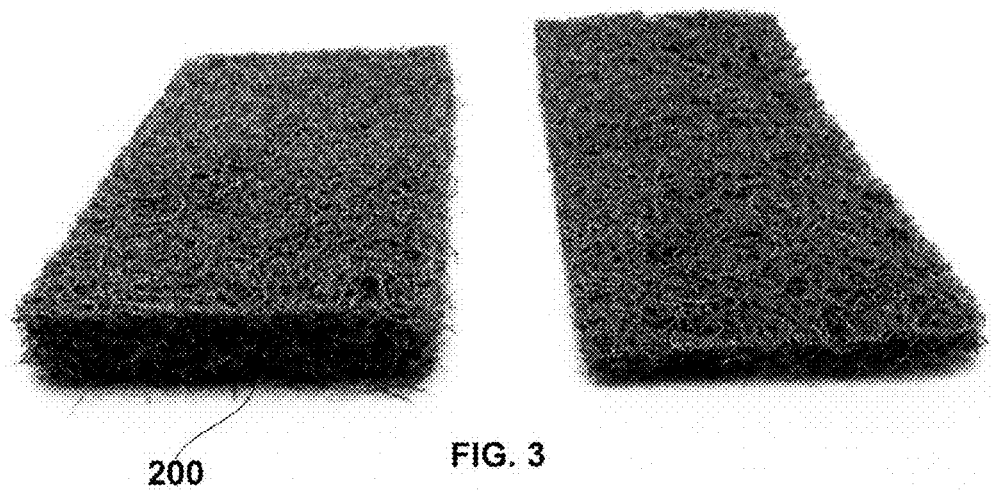
FIG. 3 is a view of coconut fiber mats of different thicknesses, according to various embodiments of the invention.

Seed quilts include at least two layers referred to herein as a "seed cover" and a "grow substrate." In use, the grow substrate is typically placed facing the water source and is not exposed to light and the seed cover is oriented such that it is exposed to ambient light or a light source. The seed cover and the grow substrate are connected at attachment points or bonding regions to form seed cells configured to each hold one or more seeds. The seed cover and grow substrate may be connected at the attachment points using glue, thermal bonding, an adhesive layer, or any other method appropriate for the materials. In some embodiments, the attachment points are selected by pressing the seed cover and grow substrate together at the attachment points using a press. This produces a laminated structure at the attachment points.

Placement of the seeds within the seed cells results in more control over distribution of the seeds, relative to a system that did not include one or more seed cells. The seed cover and grow substrate also reduce the amount of light received by the seeds in the seed cells, relative to ambient light. For example, the seed cover optionally has an opacity selected to create a light level better for the germination of seeds, relative to ambient light, e.g., daylight. Placement of the seeds within the seed cells may also be used to control humidity in the environment of the seeds. For example, the grow substrate may be configured to allow transfer of a limited amount of moisture into the seed cell. This moisture may come from water placed at the bottom of a grow tray. The control of moisture transfer may be based on porosity of the grow substrate, thickness of the grow substrate, component material of the grow substrate, and/or the like. Humidity within the seed cells is also controllable by selecting such properties for the seed cover. For example, while the grow substrate controls entry of moisture into the seed cell, the seed cover controls transport of moisture from the seed cell. The seed cover is optionally made of a hydrophobic material. Both the seed cover and the grow substrate can each include multiple layers of materials. Seed cells can include growth assisting or enhancing materials like soils, fertilizers, microbes, pH buffering substances, humidity and moisture control elements, biochar, coffee grounds, sawdust, agar, growth media, fungi spores, seeds, and/or the like.

The seed cover, grow substrate and attachment points are optionally further configured such that the volume of the seed cell can expand as the seeds germinate. This expansion in volume is referred to herein as "puffing" because the seed cell can appear to expand as growing sprouts push on the seed cover. During puffing the parts of the grow substrate and seed cover (that are not included in the attachment points) separate from each other. The puffing can be used as an indicator that the seeds are germinating. Puffing can result in the merging of seed cells as the seed cover and grow substrate separate. This merging is referred to herein as "ballooning."

After an initial growth stage, the seeds are typically ready for more light and a change in humidity. This change can be obtained in several ways. In some embodiments the seed cover is configured to be separated from the grow substrate manually. For example, a user may peel the seed cover off of the grow substrate manually, or a machine may be used to pull off the seed cover. Alternatively, the sprouts may push the cover aside as they grow taller without a user or machine removing the cover. Alternatively, in some embodiments the seed cover is configured to break in response to pressure exerted by the growing sprouts. The seed cover may be thus configured by appropriate selection of material, thickness, strength of the bonding between the grow substrate and seed cover at the attachment points, and/or scoring or perforation of the seed cells.

The change that occurs when the growing sprouts break through the seed cover simulates emergence of the germinating plants from soil to daylight. The Seed Cover 400 provides reduced light, increased humidity, and pressure on the seeds during the initial growth stage. The selection of which approach (manual or breakthrough) is used to expose the plants to the change in light and moisture is optionally dependent on the type of the plants and the density of the seeds. For example, approximately 100 cabbage seeds in an approximately $29/32"\times 27/32"$ seed cell are preferably exposed through seed quilt ballooning and manual removal of the seed cover, while approximately 100 basil seeds in an approximately $29/32"\times 27/32"$ seed cell typically require manual removal of the seed cover after seed cell puffing but before seed quilt ballooning. Approximately 50 radish seeds in an approximately $29/32"\times 27/32"$ seed cell typically puff the seed cell and then break through the seed cover at stress points along the attachment points, rather than through ballooning of the seed quilt and manual removal of the cover. The selection between manual separation and breakthrough separation is also optionally dependent on the application in which the plants are grown. For example, a seed quilt designed for a home user might be designed for ballooning and subsequent manual seed cover removal because more user involvement is fulfilling and increases feelings of ownership and nurturing. On the other hand, another type of home user may prefer a seed quilt designed for breakthrough without manual intervention such that no intervention is required. It may be preferable for seed quilts designed for use in larger scale commercial growing systems to be designed for ballooning and peeling of the seed cover all in one piece, whether manually or robotically, such that ripped seed cover pieces do not get lost among the plants or in the plumbing.

In various embodiments, the seed cover comprises wax, parchment, or other treated or untreated papers, plastic films, light blocking or spectrum filtering materials, fabrics, and/or the like. In various embodiments, the seed cover layer may be less than 0.3, 0.1, 0.07 or 0.04 millimeters thick, or have a size within any range between these values. The seed cover may also be thicker than 0.3 mm or thinner than 0.04 mm. In various embodiments, the seed cover is configured to block at least 10, 25, 50, 75 or 100% of visible light. In various embodiments, the grow substrate comprises plant based or synthetic materials, such as hemp, plastic fibers, a combination of plastic and natural fibers, paper, cotton, and/or the like. The grow substrate layer may be less than 1, ½, or ¼ inches thick, or any range there between. The grow substrate may also be thicker than one inch.

There are several alternative ways in which a seed quilt can be used for germinating seeds. For example, a seed quilt may be placed in a tray with a static water source or may be placed adjacent to a flowing water source. Flowing water sources may be present in both horizontal and non-horizontal (e.g., vertical) growth orientations.

The seed quilt may be placed on a support structure or directly on the same surface that supports/contains the water. For example, the seed quilt may be placed directly on the floor of a tray or a surface of a flow channel of a hydroponics system. Alternatively, the seed quilt may be placed on one or more spacers configured to distance the seed quilt from the floor/surface. The spacer may be configured to merely position the seed quilt, and/or further configured to transport moisture or to determine the amount of standing water that can act as the reservoir as in the case of a system with a static water source. The taller the spacer, the more water that can be held in the "reservoir." In various embodiments, the seed quilt is used or provided in combination with a plastic, glass, glazed ceramic or metal spacer. In various embodiments the spacer may be equipped with electronic sensing, mechanical linkages or attachments, or visual aids meant to convey information about the growing plants, or conditions of the tray such as water level.

If a spacer is not used, then water is typically added to the seed quilt periodically. This is to avoid overwatering of the seeds which can delay or inhibit germination entirely as well as promote unwanted bacterial growth. Water is added to the tray periodically as the seeds germinate and the resulting sprouts grow, soaking up the water available.

In some embodiments, the seed quilt is used/provided in combination with a fibrous and/or plant based spacer. For example, seed quilts may be supported by a mat including coconut fiber. The coconut fiber serves to both position the seed quilts and to transport moisture. The coconut fiber may provide a better environment for root growth, relative to plastic or metal spacer. Coconut fiber also may provide transport of water to the seed quilts. For example, a coconut fiber may be configured to move water from a reservoir to the seed quilts. Specifically, a coconut fiber mat placed at the bottom of a tray can transport water to a seed quilt for an extended period. This is desirable behavior because it minimizes the likelihood of overwatering the seeds. The thickness and/or density of the coconut fiber are optionally configured such that the tray need only be filled with water once, until the desired time to harvest. Because the coconut fiber transports moisture, roots of the sprouts receive sufficient water as they grow through the coconut fiber, even as the water level decreases as a result of evaporation and consumption. In this approach, the initial level of the water may be just below the seed quilt. As the seeds germinate, sprout, and grow, consuming water, the water level in the grow tray falls. Less often, or perhaps only an initial, watering is needed. The growing system is typically configured such that the roots grow through the grow substrate into the coconut fiber mat and further into the plane of the spacer, meaning the roots will have contact with the water level wherever it may be or if not, have access to water through the moist coconut fiber mat. A fibrous spacer, such as the coconut mat, may also be configured to allow airflow around roots of the sprouts resulting from the seeds.

In some embodiments, both a passive spacer (e.g., plastic grid) and an active spacer capable of transporting water (e.g., coconut or other plant fiber) are used in combination. The active spacer is generally placed on top of the passive spacer. When used with a passive spacer, the coconut fiber spacer may be thinner relative to systems that do not include a passive spacer.

Seed quilts are optionally used in non-horizontal geometries. For example, a seed quilt can be hung against a surface on which water periodically flows. This surface may be an (approximately) or precisely vertical wall or a tilted wall. The water may be transported and/or circulated via pumps and/or gravity and/or wicking or capillary action. The use of a seed quilt on a non-horizontal surface may or may not include use of active or passive spacers as discussed elsewhere herein. The use of a seed quilt in a vertical growing system typically results in root growth along the plane of the grow substrate, rather than through the grow substrate, which still anchors the plants in a desirable manner.

Seed quilts optionally include features configured to facilitate draping or hanging or fastening. For example, a seed quilt may have a centered region of attachment points that allow the seed quilt to be draped over a rod or wire. This region of attachment points is optionally wider than other regions of attachment points that separate seed cells. In another example, a seed quilt may have a region of attachment points on one or more edge that is wider than other regions of attachment points that separate seed cells. The wider regions facilitate attachment of clips or placement of holes through which hanging hooks or pegs can be placed. When draped or hung seed quilts may be watered from the device over which they are draped or from an external spray.

FIG. 1 is a view of three different sizes of grow trays that could be used to grow differently sized seed quilts, according to various embodiments of the invention. Specifically, FIG. 1 illustrates three Grow Trays 100 measuring approximately 10"×10", 10"×20", and 7"×12," respectively. Each of the Grow Trays 100 may be used to germinate seeds within seed quilts of corresponding or smaller sizes. In some embodiments, seed quilts are produced in a standard size and then cut to fit specific tray sizes. Alternatively, more than one seed quilt may be placed side-by side in one of Grow Trays 100. Grow Trays 100 can include a wide variety of depths, sizes, and/or materials.

FIGS. 2a and 2b include views of various sizes of coconut fiber Mats 200 that may be used in conjunction with the Grow Trays 100 in FIG. 1, according to various embodiments of the invention. Specifically, FIG. 2a includes a close-up view of a coconut fiber Mat 200 configured to fit in the 7"×12" Grow Tray 100 shown in FIG. 1. The coconut fibers included in this embodiment of Mat 200 are pressed together but loose enough to allow good air flow. FIG. 2b illustrates three different shapes of coconut fiber Mats 200 cut to fit the Grow Trays 100 illustrated in FIG. 1.

Mats 200 may be made of materials other than coconut fiber. For example, Mats 200 may include fibrous or non-fibrous materials, organic or inorganic materials, in addition to or instead of coconut. Mats 200 are optionally treated with antiseptic substances or processes or antifungal substances before use. Mats 200 optionally contain substances such as nutrients or fertilizer to enhance the growing of Plants 700. The height of the coconut fiber Mat 200 plus the height of a passive spacer depending on the application determines the amount of Water 710 preferably added when starting growth of a Seed Quilt 300. A thicker coconut fiber Mat 200 allows more Water 710 to be initially added, and therefore the user doesn't have the replenish the water as frequently if at all during the growing process.

FIG. 3 is a view of coconut fiber Mats 200 of different thicknesses, according to various embodiments of the invention. Illustrated are Mats 200 that are 1" and 0.5" thick.

Figure 4:
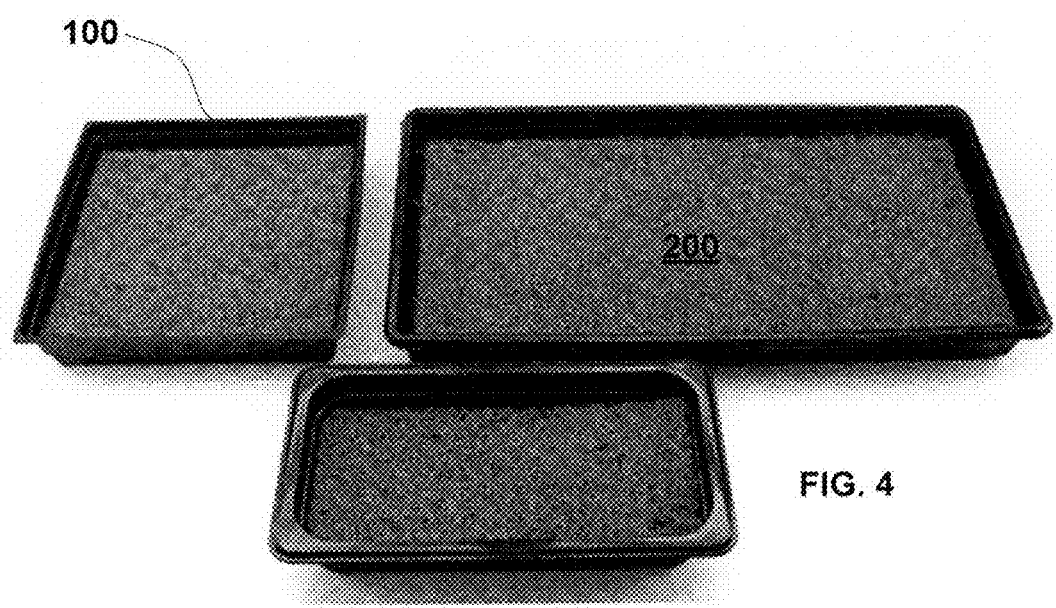
FIG. 4 is a view of the different sized grow trays containing correspondingly sized coconut fiber mats, according to various embodiments of the invention.

FIG. 4 is a view of the different sized Grow Trays 100 containing correspondingly sized coconut fiber Mats 200, according to various embodiments of the invention.

FIGS. 5a and 5b include views of two different sized Grow Trays 100 containing correspondingly sized coconut fiber Mats 200 and correspondingly sized Seed Quilts 300, according to various embodiments of the invention. Specifically, FIG. 5a illustrates a Growing System 510 including a 7"×12" Grow Tray 100 and correspondingly sized coconut fiber Mat 200 and a Seed Quilt 300. The Seed Quilt 300 has sixteen Seed Cells 500 created by trapping Seeds 600 in between the Grow Substrate 800 (not visible) and a Seed Cover 400. Each of Seed Cells 500 are bounded by a Bonded Region 520 of attachment points. The Bonded Region 520 is where the Grow Substrate 800 and the Seed Cover 400 are attached to each other. Grow Substrate 800 and Seed Cover 400 are attached to each other within the Bonded Regions 520. This attachment may be direct or with an intermediary material. Before sprouting of the seeds, the Bonded Regions 520 are typically at least ⅛, ¼ or ½ inches wide, or any range there between, although other widths are possible. If adhesives are used in the bonding, the bonding region could be as thick as the line of adhesive and still be stronger than a thermal process. As shown in FIG. 5a, Seeds 600 are confined within the Seed Cells 500 produced by the Bonded Regions 520. In various embodiments, Seed Cells 500 are at least 0.25, 0.5, 0.75, 1, 2 or 5 square inches, or any range there between. Seed Cells 500 may also be smaller in area than 0.25 square inches. Seed Cells 500 are typically larger than would be required to hold the un-sprouted seeds they contain. This allows for puffing during the initial growth as well as expansion of the seeds as they absorb water in preparation for and during germination. Seed Cells 500 may include no seeds, a single seed, dozens or hundreds of seeds. Seed Cells 500 that do not contain seeds may have slits configured for an end user to insert their own seeds. A particular Seed Cell 500 may contain one type of seed or multiple seed types that will produce a variety of different sprouts grown together. Different Seed Cells 500 within one Seed Quilt 300 may include different types of Seeds 600.

In some embodiments, Seed Quilts 300 are provided without seeds. In these embodiments, slits or other perforations are included in the Seed Cover 400 such that a user can add their own seeds. In some embodiments, the Seed Cover 400 is perforated for easy tearing such that it is easier for Plants 700 to break through. Seed Quilts 300 and Seed Cells 500 may take a wide range of alternative geometries. For example, Seed Cells 500 may be square, round, rectangular, hexagonal, pentagonal, etc. Seed Quilts 300 can be treated as a textile and used in such applications as fashion or interior design. Seed Quilts 300 can be planted on soil or used in hydroponic, aeroponic, or aquaponic applications and other growing techniques.

FIG. 5b illustrates a larger embodiment of Growing System 510, including a 10"×20" Grow Tray 100 and correspondingly sized coconut fiber Mat 200 and Seed Quilt 300. This instance of Seed Quilt 300 includes sixty-four Seed Cells 500.

FIGS. 6a and 6b include a comparison of Growing System 510 including Grow Tray 100 having plants growing from a Seed Quilt 300 with and without the use of a coconut fiber Mat 200, according to various embodiments of the invention. Specifically, FIG. 6a illustrates and example of Growing System 510 without a coconut fiber Mat 200. The Seed Quilt 300 in this example sits directly on the bottom of the Grow Tray 100. Visible are the growing Plants 700 and the Grow Substrate 800 of the Seed Quilt 300. The Seed Cover 400 has been removed to reveal the Plants 700 and the Grow Substrate 800 is visible in the Bonded Regions 520 where seeds are not present.

FIG. 6b illustrates a Growing System 510 including a Grow Tray 100 and a coconut fiber Mat 200. Visible are the growing Plants 700 and the Grow Substrate 800 of the Seed Quilt 300 in the Bonded Regions 520 where seeds are not present. The Seed Cover 400 has been removed to expose the plants, so the Seed Cover 400 and Grow Substrate 800 are no longer bonded together. The coconut fiber Mat 200 is visible under the Seed Quilt 300. In the embodiments illustrated in FIGS. 6a and 6b, the Seed Cover 400 has been manually removed. If the Plants 700 had been allowed to break through the Seed Cover 400 the Seed Cover 400 would still be on top of the Grow Substrate 800 in the Bonded Regions 520, and fully or partially ripped sections of the Seed Cover 400 might be interspersed among the plants.

As illustrated in FIGS. 6a and 6b, the plants grown with the coconut fiber Mat 200 have grown larger and more appealing relative to those grown without the coconut fiber Mat 200, in otherwise similar times and conditions. The amount of labor and attention needed from the user was also significantly lower when using the coconut fiber Mat 200.

Figure 7A:
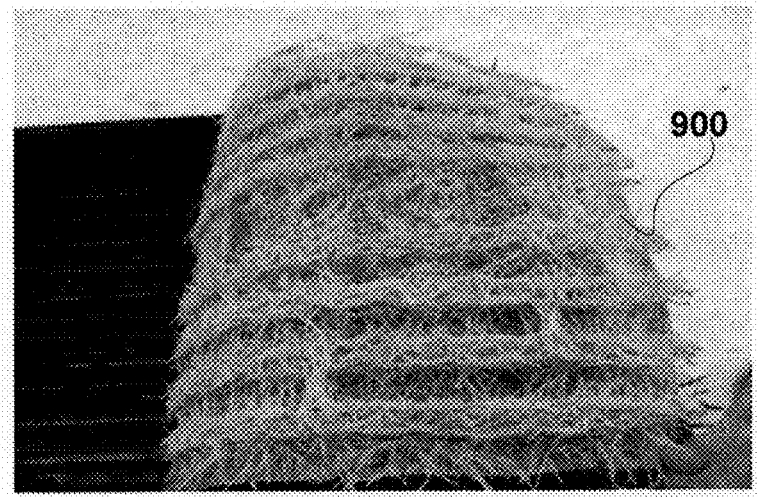
FIGS. 7a and 7b illustrate a comparison view of the roots of plants grown without the use of a coconut fiber mat and the roots of plants grown with the use of a coconut fiber mat, according to various embodiments of the invention.
Figure 7B:
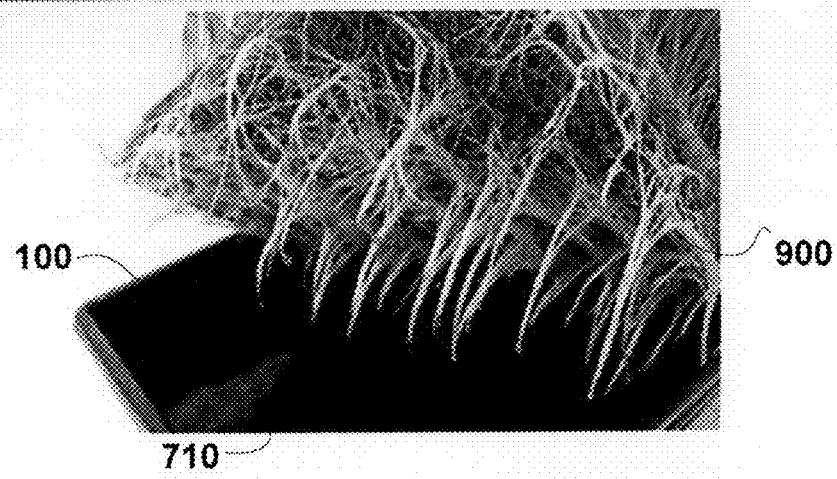

FIGS. 7a and 7b illustrate a comparison view of the Roots 900 of Plants 700 grown with and without the use of a coconut fiber Mat 200, according to various embodiments of the invention. Specifically, FIG. 7 is a comparison view of the Roots 900 of Plants 700 grown in a Growing System 510. FIG. 7a illustrates the Roots 900 of Plants 700 grown without a coconut fiber Mat 200 2. The Roots 900 have formed a tight mat having a shape conforming to the trough pattern in the Grow Tray 100. The Grow Substrate 800 is visible behind the Root 900 mat. Water 710 in the bottom of the Grow Tray 100 has kept the growing Plants 700 irrigated. FIG. 7b illustrates the Roots 900 of Plants 700 grown in a Growing System 510 including a coconut fiber Mat 200. The Roots 900 have grown through the coconut fiber Mat 200. During growth of the Plants 700, the Mat 200 and Roots 900 either are immersed in the Water 710 entirely or drawing water from the bottom of the Grow Tray 100 as the water is used up by the plants or through evaporation. In comparing the examples of FIGS. 7a and 7b, the roots of the plant have better differentiated into air roots residing in the coconut fiber mat, and water roots residing in the water at the bottom of the tray.

Figure 8B:
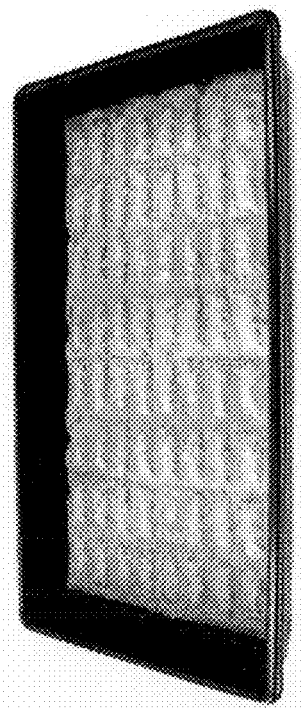
FIGS. 8a-8d illustrate expansion of seed cells during growth of plants, according to various embodiments of the invention.
Figure 8D:
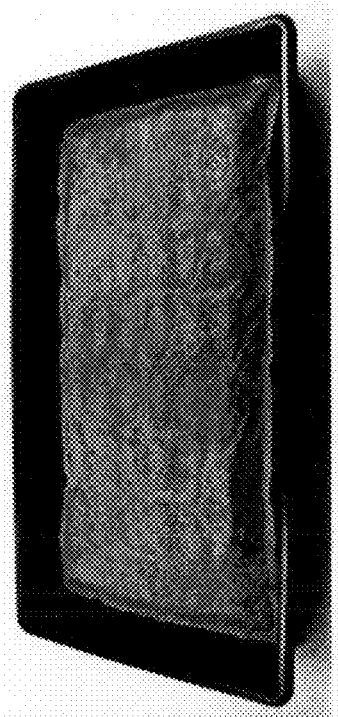
Figure 8A:
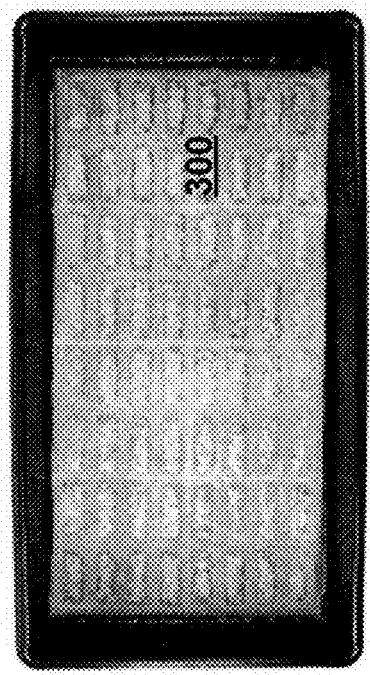
Figure 8C:
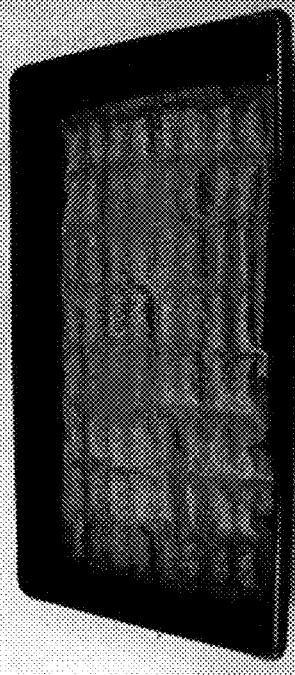

FIGS. 8a-8d illustrate expansion ("puffing") of a Seed Quilt 300 during growth of Plants 700, according to various embodiments of the invention. Specifically, FIGS. 8a-8d illustrate the progression of the germination of Seeds 600 from a Seed Quilt 300. As the Seeds 600 germinate, the growing plants 700 push the Seed Cover 400 away from the Grow Substrate 800. In FIG. 8a the Seed Quilt 300 is newly planted and the Seed Cells 500 are separate and distinct. In FIG. 8b some time has passed and the Seeds 600 have started germinating and sprouting. The Seed Cells 500 are starting to puff out more as part of the puffing process. In FIG. 8c more time has passed and the sprouting Plants 700 are getting larger. FIG. 8d further illustrates merging of seed cells as the seed quilt balloons.

The force of the growing Plants 700 causes the Seed Cover 400 to separate from the Grow Substrate 800 (not visible) below the Seed Cover 400. As a result, Seed Cells 500 begin to balloon and merge. The Bonded Regions 520 have been significantly reduced. In FIG. 8d, after several days, all Seed Cells 500 have combined into one open volume as the Seed Cover 400 is pushed almost entirely off of the Grow Substrate 800. At this point, for this particular type of Plant 700 type, the Seed Cover 400 is essentially removed and only Bonded Regions 520 near the perimeter may remain. Other types of Plant 700, different types of Seed Cover 400, and/or different strength of bonding may produce different results. The growing sprouts have been well distributed throughout the Growing System 510 due to the initial Seed Cells 500.

FIGS. 9a-9f illustrate removal of a Seed Cover 400 from a Seed Quilt 300, according to various embodiments of the invention. Specifically, the Seed Cover 400 is removed from the Grow Substrate 800 once the Seed Cover 400 has ballooned to a desired extent. A user need only to peel the corner of the Seed Cover 400 away from the Grow Substrate 800 and continue peeling until the Seed Cover 400 is completely removed. This exposes the growing Plants 700 to more light and ambient air. Note the user is not required to start peeling at a corner, it is typically just the easiest place to start.

As illustrated by FIGS. 9a-9f, the process of removing a fully ballooned Seed Cover 400 is straightforward. For the case of the non-perforated Seed Cells 500, the degree of ballooning may vary based on the type of plant. Certain plants are robust and grow fast, easily pushing the Seed Cover 400 up. Other types of Plant 700 may be more delicate or slow growing, meaning that the cover may not balloon completely in a reasonable amount of time. To mitigate issues related to too much humidity or poor air circulation, the Seed Cover 400 may need to be removed before all seed cells have merged, e.g., half the seed quilt has ballooned and half the Seed Cells 500 are still only puffing. The ballooning effect as well as the perforation tearing effect can be used for Seed Quilts 300 grown horizontally and/or vertically, as well as any other angles or configuration.

Seed Quilts 300 can be designed with and without perforations in the Seed Cover 400 over the Seed Cells 500. When perforated, the Plants 700 more easily tear open the individual Seed Cells 500 as they grow. When the Seed Cells 500 are not previously perforated, the growing plants push against the Seed Cover 400, delaminating the Seed Cover 400 from the Grow Substrate 800 and causing ballooning. In this case, individual Seed Cells 500 disappear and once the Seed Cover 400 is detached from the Grow Substrate 800, with the exception of the perimeter of the Seed Quilt 300, the user can remove the cover and expose the plants to air and light. If the user waits longer to remove the Seed Cover 400, the sprouts may continue to push against it, beginning to detach the perimeter of the Seed Cover 400 from the Grow Substrate 800 as well. Even if the Seed Cells 500 are not previously perforated, the Seed Quilt 300 can be configured such that sprouting plants break through the Seed Cover 400 by creating stress along the attachment points or by piercing through the Seed Cover 400 entirely.

FIGS. 10a and 10b illustrate a cross-sectional view of Growing System 510 including a Seed Quilt 300 and a coconut fiber Mat 200 within a Grow Tray 100, according to various embodiments of the invention. Specifically, FIG. 10a illustrates that at planting the Seeds 600 are contained within their Seed Cells 500. The Water 710 is at a level approximately equal to the height of the coconut fiber Mat 200. Sometime later, as illustrated in FIG. 10b, the Plants 700 are shown with stems and leaves emerging above the Seed Quilt 300 and Roots 900 growing downwards into/through the coconut fiber Mat 200 and towards the bottom of the Grow Tray 100. The level of Water 710 is shown to have been reduced toward the bottom of the Grow Tray 100. Those Roots 900 above the level of the Water 710 can still get moisture transported via the coconut fiber Mat 200.

The Roots 900 differentiate into air roots and water roots. The air roots are more delicate and "fuzzy." These Roots 900 form above the Water 710 level. The water roots are in contact with the Water 710 and provide Water 710 to the Plant 700 and also pull some oxygen, out of the Water 710. For the growing system described, the air roots provide oxygen for root respiration and the water roots transport Water 710 to the Plant 700. The Roots 900 that are above the Water 710 and in the coconut fiber Mat 200 are referred to as "air roots" and the roots in the pooled Water 710 are referred to as "water roots." The fibers of the coconut fiber Mat 200 are loosely enough packed such that air can get in easily, this allows the Roots 900 to get a good supply of oxygen, lowering the likelihood of mold or bacterial outbreaks.

Figures 11A, 11B:
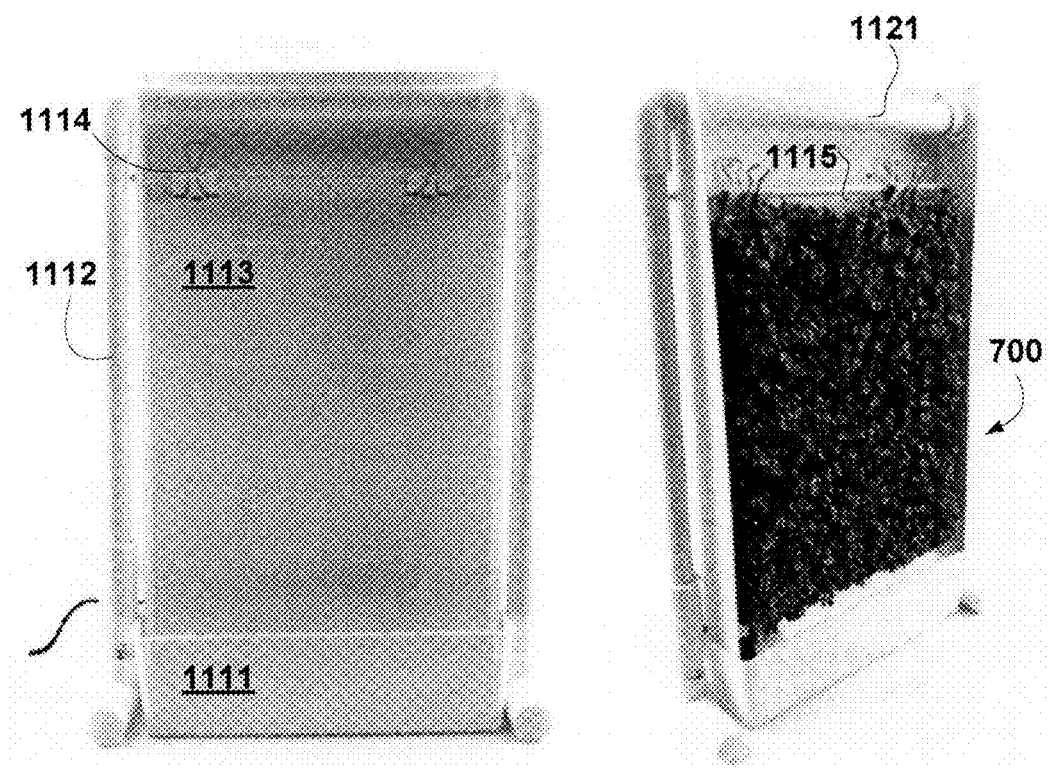
FIGS. 11a-11b illustrates two views of a vertical growing system, one without a vertically growing seed quilt and one with a seed quilt, according to various embodiments of the invention.

FIGS. 11a-11b illustrates two views of a vertical embodiment of Growing System 510, one without and one with a Seed Quilt 300, according to various embodiments of the invention. Specifically, FIG. 11a illustrates a support and irrigation structure without a Seed Quilt 300 and FIG. 11b illustrates the same system with a Seed Quilt 300. The support and irrigation structure FIG. 11 are included in embodiments of Growing System 510. These embodiments include a Splash Guard 1113 which is connected to a System Frame 1112. A seed quilt Hanging Rod 1115 spans a width of the Splash Guard 1113 and is offset from a back wall of the Splash Guard 1113 to leave space for Seed Quilt Clips 1114. The Seed Quilt Clips 1114 are configured to hang from the seed quilt Hanging Rod 1115.

FIG. 11b illustrates a Seed Quilt 300 hanging from the Seed Quilt Clips 1114 with Plants 700 growing therefrom. The seed quilt Hanging Rod 1115 is configured to hold the Seed Quilt 300 positioned within the footprint of a Water Reservoir 1111. A Water Source 1121 is configured to deliver water to the hanging Seed Quilt 300.

Other embodiments of Growing System 510 can include different vertical or horizontal systems of a wide variety of alternative designs and styles. These systems can include materials other than those shown. Further, other elements such as moisture sensors, water control systems, and lighting may be included. Consumer and/or Commercial scale systems may be computer controlled and include internet enabled and/or wireless sensing devices.

FIGS. 12a-12b include detailed views of part of the vertical growing system illustrated in FIGS. 11a-11b, according to various embodiments of the invention. Specifically, FIG. 12a illustrates an Irrigation System 1210 configured to provide water to Water Source 1121. FIG. 12b illustrates a Water Pump 1217, a System Controller 1219, and a Power Supply 1220. FIG. 12a illustrates Water Pump 1217, which optionally sits inside Water Reservoir 1111, with a pump filter attached to its inlet. The Water Pump 1217 outlet connects to Irrigation Piping 1216, which leads to Water Source 1121. A System Frame 1212 both frames Water Reservoir 1111 and supports splash guard 1113 (FIG. 11); and also provides a piping (fluid) channel from the Water Pump 1217 to the Water Source 1121. FIG. 12b further illustrates how the Water Pump 1217 may connect to power via Power Supply 1220. A System Controller 1219 is wired between the Water Pump 1217 and Power Supply 1220.

Figure 13B:
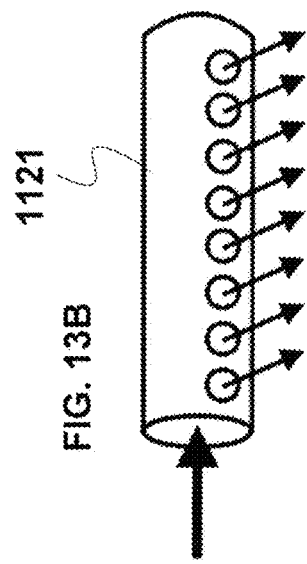
FIGS. 13a and 13b include schematic diagrams of a vertical irrigation system, according to various embodiments of the invention.
Figure 13A:
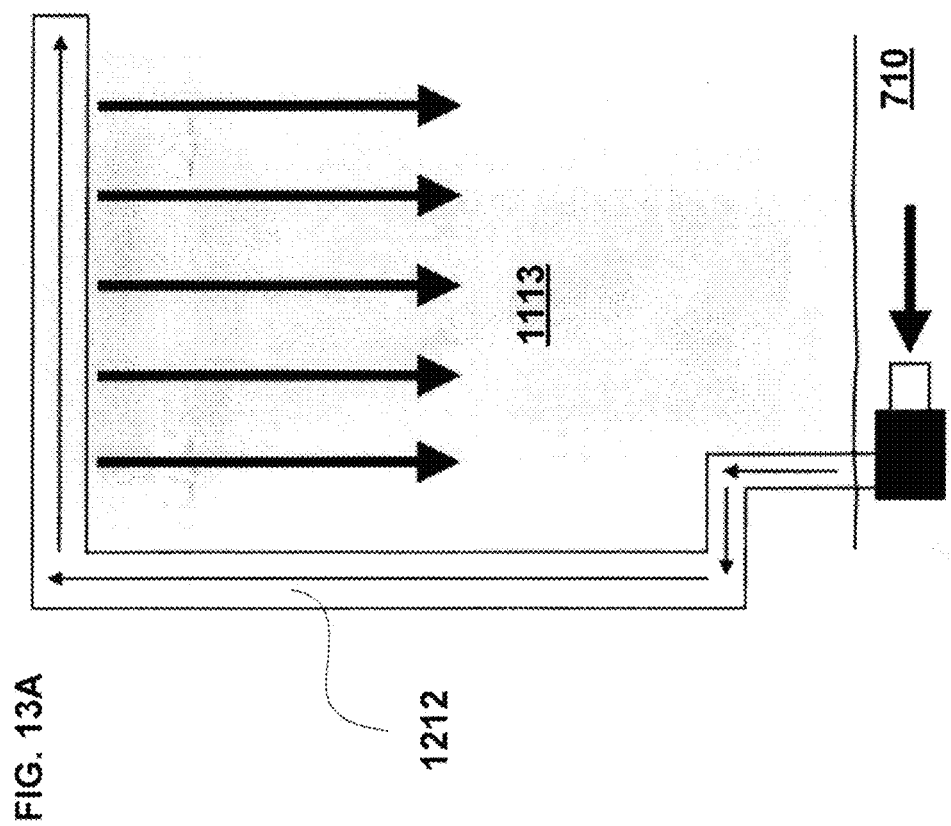

FIGS. 13a and 13b include schematic diagrams of the irrigation system represented in FIGS. 12a and 12b, according to various embodiments of the invention. Specifically, FIG. 13a illustrates a path of Water 710 from the Water Reservoir 1111, into the Water Pump 1217, through Irrigation Piping 1216 in the System Frame 1212, and out through holes in Water Source 1121. From these holes the Water 710 forms a curtain along Splash Guard 1113, wherein some of Water 710 is absorbed by a hanging Seed Quilt 300. That water that is not absorbed drains back into the Water Reservoir 1111. Optionally, Water 710 only travels inside the one side of the System Frame 1212.

FIG. 13b includes a detailed view of Water Source 1121. Holes are spaced along Water Source 1121 and angled downwards at about 45 degrees such that Water 710 hits the Splash Guard 1113 and streams down adjacent to Seed Quilt 300. Where Seed Quilt 300 is sufficiently close to Splash Guard 1113 the water is received by Growth Substrate 800.

FIG. 14 illustrates a Seed Quilt Growing Kit 1410, according to various embodiments of the invention. Seed Quilt Growing Kit 1410 includes a Grow Tray 100 and a Grow Tray Lid 1422. Grow Tray Lid 1422 is cut to fit inside a rim of the Grow Tray 100. Grow Tray Lid 1422 may be used to retain a Mat 200 and a Seed Quilt 300 within Grow Tray 100 during shipment and storage. Further, Grow Tray Lid 1422 may also be used to control the amount of light received by Seeds 600 during germination. For example, Grow Tray Lid 1422 may be placed directly on top of Seed Quilt 300 during the germination process. The Grow Tray Lid 1422 is free to move vertically and is pushed upward as the Plants 700 grow.

Figure 15C:
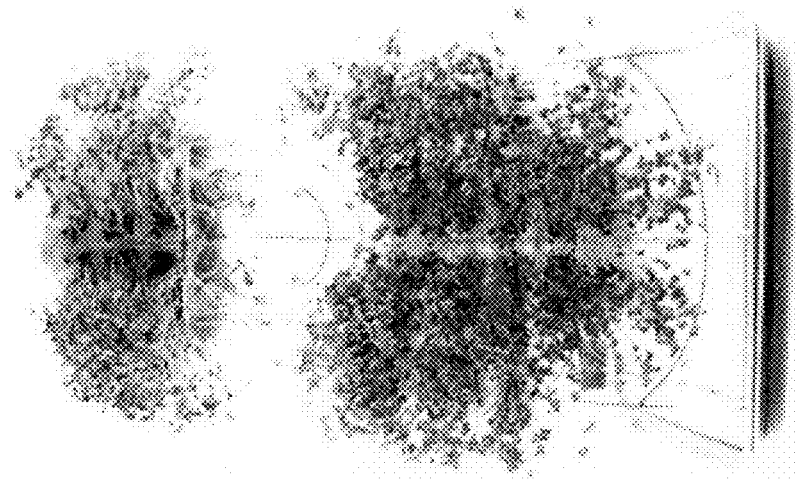
FIGS. 15a-15c illustrate an alternative growing structure, according to various embodiments of the invention.
Figure 15B:
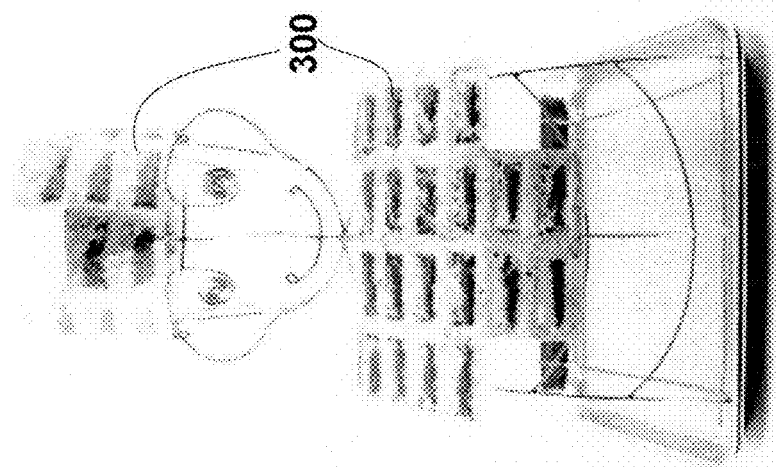
Figure 15A:
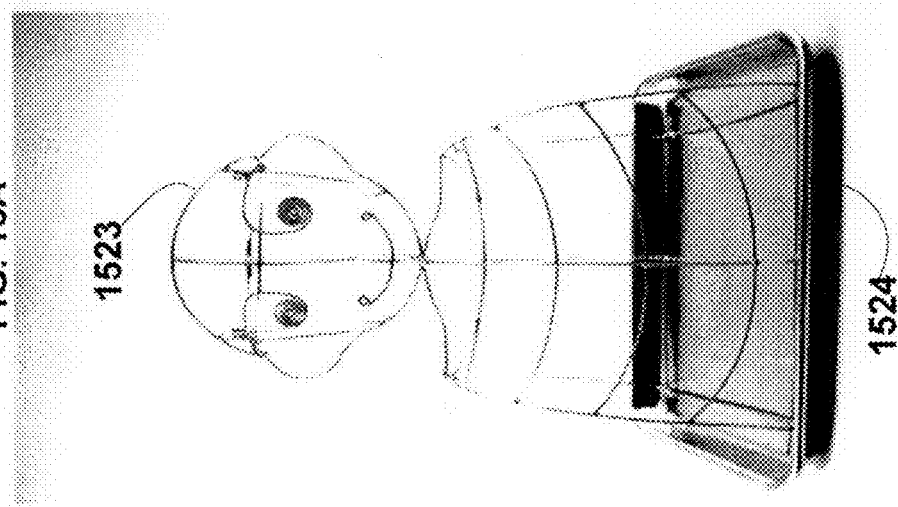

FIGS. 15a-15c illustrate an alternative growing structure, according to various embodiments of the invention. Specifically, a Contour Framework 1523 and a Drip Tray 1524 are used to support one or more Seed Quits 300. As the Seed Quilts 300 sprout, the resulting plants take a shape of the Contour Framework 1523. A wide variety of alternative shapes and configurations are possible. Seed Quilts 300 may be used as clothing, furniture, room dividers, and/or the like. Seed quilts 300 can contain grommets for easier mounting or other reference hardware to allow it to interface with growing systems. They can also contain malleable mesh to allow it to conform to a complex surface. Seed Quilts 300 can include electronic sensors and/or lights. The Contour Framework 1523 is optionally made of a sheet material, including holes and a water spraying mechanism inside. The Contour Framework 1523 optionally includes an irrigation system that entails dripping, bubbling over, or spraying from above. The Contour Framework 1523 optionally includes a double layer of sheet material where Water 710 is pumped between layers, and the outer layer has holes in it through which Water 710 drips.

The Contour Framework 1523 can be any size or shape as long as it is possible to water the Roots 900 or wet the Grow Substrate 800. Seed Quilts 300 can be draped, clipped, and attached chemically or mechanically to the Contour Framework 1523. The Contour Framework 1523 can come with extra parts like string or rubber bands to attach the Seed Quilts 300 to the Contour Framework 1523 or for making the Seed Quilts 300 wearable. The Contour Framework 1523 can sit above a Water Reservoir 1111 instead of a Drip Tray 1524, especially if there is a recirculating irrigation system. The growing system comprised of a Contour Framework 1523 can be used with an artificial light. This growing system might have customizable parts, such as the wireframe face, which could be made by the user in order to customize the features or expression. The Contour Framework 1523 could have attachments for a banner that is decorated and attached for customization. The Contour Framework 1523 can move passively like a mobile or actively like a robot. The Contour Framework 1523 could also be electronic, be interactive, or monitor environmental conditions and report them to the user. Water 710 can be sprayed onto either of the Seed Quilts 300. Excess Water 710 dripping from the Seed Quilts 300 will be caught by the Drip Tray 1524.

Figure 16A:
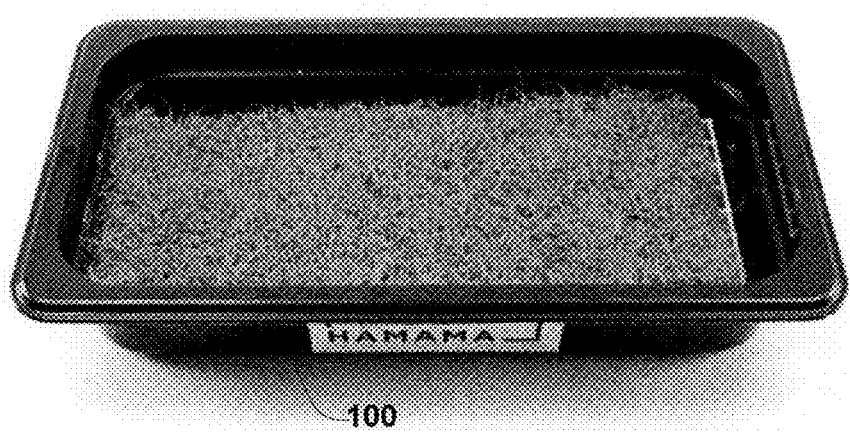
FIGS. 16a and 16b illustrate a growing system including a growing tray, a mat and a spacer, according to various embodiments of the invention.
Figure 16B:
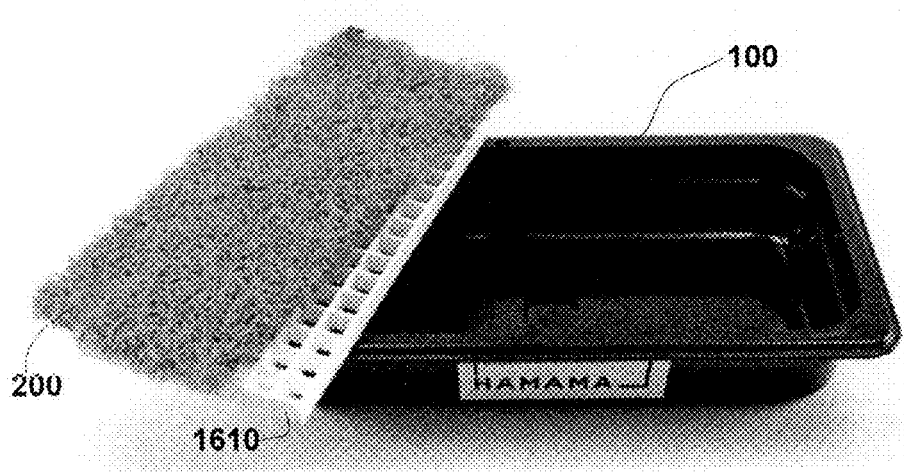

FIGS. 16a and 16b illustrate a Growing System 510 including a Grow Tray 100, a mat 200 and a Spacer 1610, according to various embodiments of the invention. Spacer 1610 is configured to raise Mat 200 from the bottom of Grow Tray 100. Spacer may be plastic, metal and/or some other suitable material. FIG. 16a illustrates the Mat 200 and the Spacer 1610 disposed within Grow Tray 100. FIG. 16b illustrates these elements lifted out of Grow Tray 100. Spacer 1610 includes openings sufficient for Roots 900 to penetrate and reach Water 710. Multiple Spacers 1610 are optionally used to position Seed Quilt 300 at different heights within Grow Tray 100. Spacers 1610 are typically between and 1 inches in height, although other heights may be used for specific purposes.

Figure 17A:
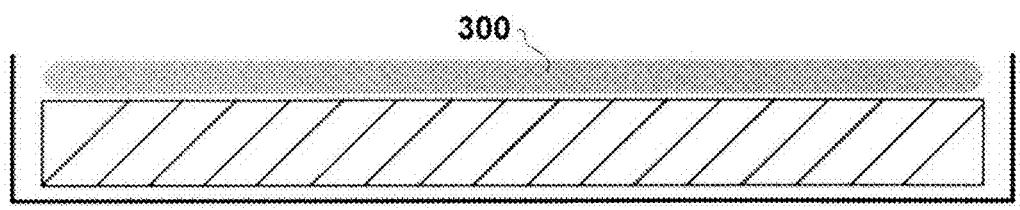
FIGS. 17a-17c illustrate growing systems including a spacer and coconut fiber mat, according to various embodiments of the invention.
Figure 17B:
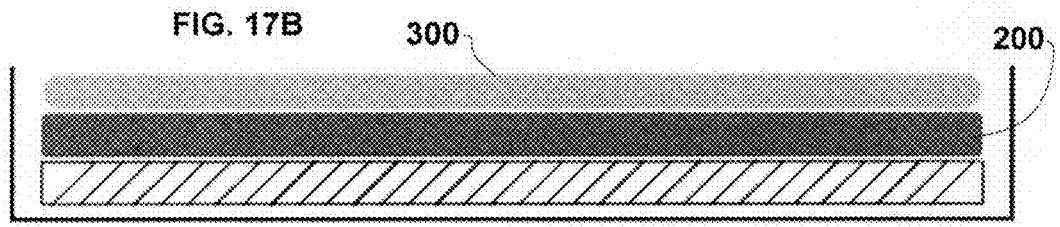
Figure 17C:
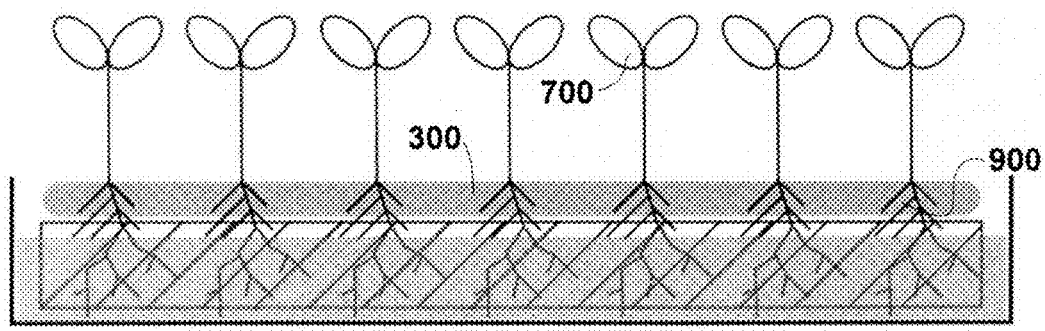

FIGS. 17a-17c illustrate growing systems including a Spacer 1610 with and without Mat 200, according to various embodiments of the invention. In FIG. 17a a Seed Quilt 300 is placed directly on Spacer 1610. In FIG. 17b an embodiment of Mat 200 is placed between Spacer 1610 and Seed Quilt 300. FIG. 17c illustrates growth of Roots 900 through Mat 200 and into the volume occupied by Spacer 1610. Note that Mat 200 may be placed above, below or between Spacers 1610. Spacers 1610 are optionally coated with antibacterial materials or plant nutrients. Spacers 1610 can have a variety of shapes and need not be a single piece. For example, Spacers 1610 can include or consist of glass beads or metal strips. Spacers 1610 are optionally directly molded into Grow Tray 100 or configured to be part of the Grow Tray 100.

Figure 18:
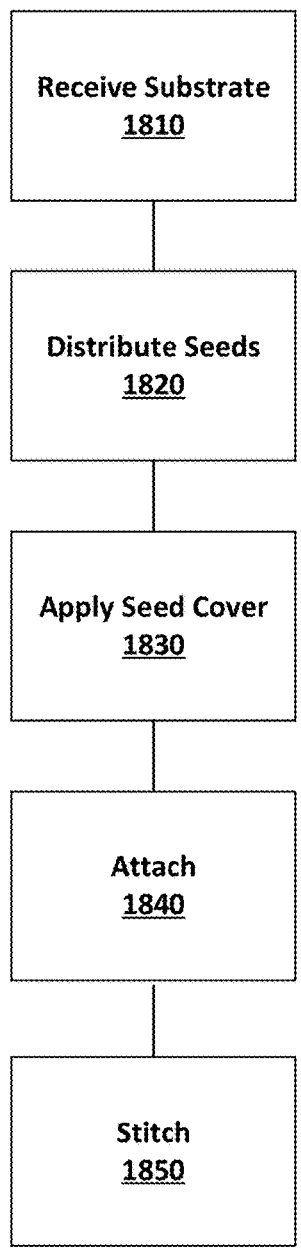
FIG. 18 illustrates methods of making a seed quilt, according to various embodiments of the invention.

FIG. 18 illustrates methods of making a seed quilt, according to various embodiments of the invention. This method may be used to create Seed Quilt 300.

In a Receive Substrate Step 1810, Grow Substrate 800 is received. The received Grow Substrate 800 can include any of the materials discussed elsewhere herein. In various embodiments Grow Substrate 800 is received as a flat sheet or as a roll of material.

In an optional Distribute Seeds Step 1820, Seeds 600 are distributed on the Grow Substrate 800. The Seeds 600 may be distributed semi-randomly such that they may be present at any point on Grow Substrate 800, or may be distributed primarily to locations at which Seed Cells 500 will be located. One or more types of seeds may be distributed together.

In an Apply Seed Cover Step 1830, a Seed Cover 400 is applied over the seeds. The Seed Cover 400 optionally includes perforations configured to make it easier for Plants 700 to break through. The applied Seed Cover 400 can include any of those Seed Covers 400 discussed elsewhere herein. The optional Seed Cover 400 perforations or slits in the case of a blank seed quilt can be made in the Seed Cover 400 before or after the Attach Step 1840.

In an Attach Step 1840, the Grow Substrate 800 and Seed Cover 400 are attached at Bonded Regions 520. They may be attached using an adhesive, heat, chemical bonding, stitching, stapling, and/or the like. For example, in some embodiments the Grow Substrate 800 and Seed Cover 400 are attached using a press having contact points in a pattern of the Bonded Regions 520. This press may be heated. In some embodiments, Attach Step 1840 is performed using a roll-to-roll system to produce a continuous strip of Seed Quilt 300. In this case, the Seed Quilt 300 may be cut into desired sizes after production. The produced Seed Quilt 300 includes Seed Cells 500, optionally containing Seeds 600.

As discussed elsewhere herein, the Seed Cells 500 are configured to retain the seeds during transport and the initial germination stage. The resulting Seed Quilt 300 is optionally perforated along Bonded Regions 520 to facilitate separation of one or more Seed Cells 500 from the Seed Quilt 300. These perforations can penetrate both the Grow Substrate 800 and the Seed Cover 400.

Figure 19:
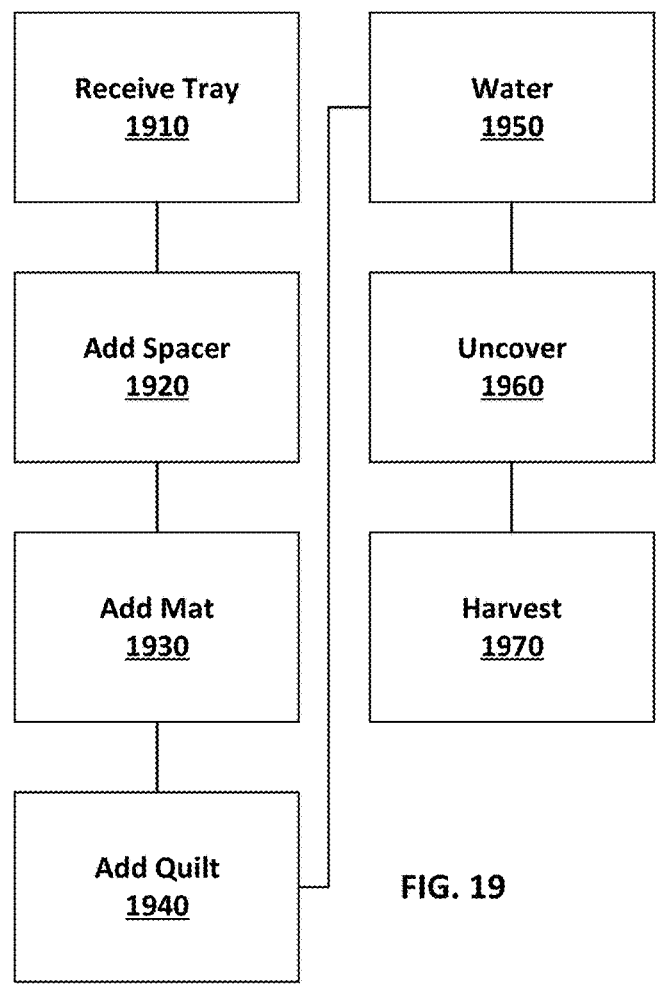
FIG. 19 illustrates methods of growing plants using a seed quilt, according to various embodiments of the invention.

The methods illustrated by FIG. 18 are optionally performed using automation machinery. Further the parts of the Seed Quilt 300 may undergo pre- and/or post-processing, for example, to add any of the additional materials discussed herein. FIG. 19 illustrates methods of growing plants using a seed quilt, according to various embodiments of the invention.

In a Receive Tray Step 1910, a Grow Tray 100 is received. In an optional Add Spacer Step 1920 one or more Spacers 1610 are placed in the Grow Tray 100. In an optional Add Mat Step 1930, one or more Mats 200 is placed in the Grow Tray 100. Note that the Spacers 1610 and Mats 200 can be placed in any order as needed for a specific purpose.

In an Add Quilt Step 1940, a Seed Quilt 300 is placed in the Grow Tray 100, on top of any added Spacers 1610 and Mats 200.

In a Water Step 1950, Water 710 is added to the Grow Tray 100. The Water 710 may be added so as to fill the Grow Tray 100 up to approximately the top of any Spacers 1610 or Mats 200 therein. The Seed Quilt is typically pressed down upon in order to ensure the Grow Substrate has sufficiently absorbed Water. It is typical to check that no water pools on the top of the Seed Cover. If water has pooled on the top of the Seed Cover, it is typical to pick up the soaked Seed Quilt, quickly tilt to drain the pooled water on the Seed Cover, and carefully place back into the Grow Tray such that no more water will pool on the Seed Cover. If necessary, some water can be emptied from the Grow Tray to ensure that pooling on the Seed Cover does not occur.

In an Uncover Step 1960, the Seeds 600 are uncovered. This may occur either mechanically by removal of the Seed Cover 400 (by machine or hand), or may occur by having the growing Plants 700 break through the Seed Cover 400.

In a Harvest Step 1970, the Plants 700 are harvested. This may be accomplished using a sharp edge such as scissors or a cutting blade. In some embodiments, the Plants 700 are harvested using automated equipment. The Plants 700 may also be harvested manually or by automated equipment by pulling on the Plants 700, which may result in some or all Plants 700 being harvested with Roots 900 still attached.

Figure 20:
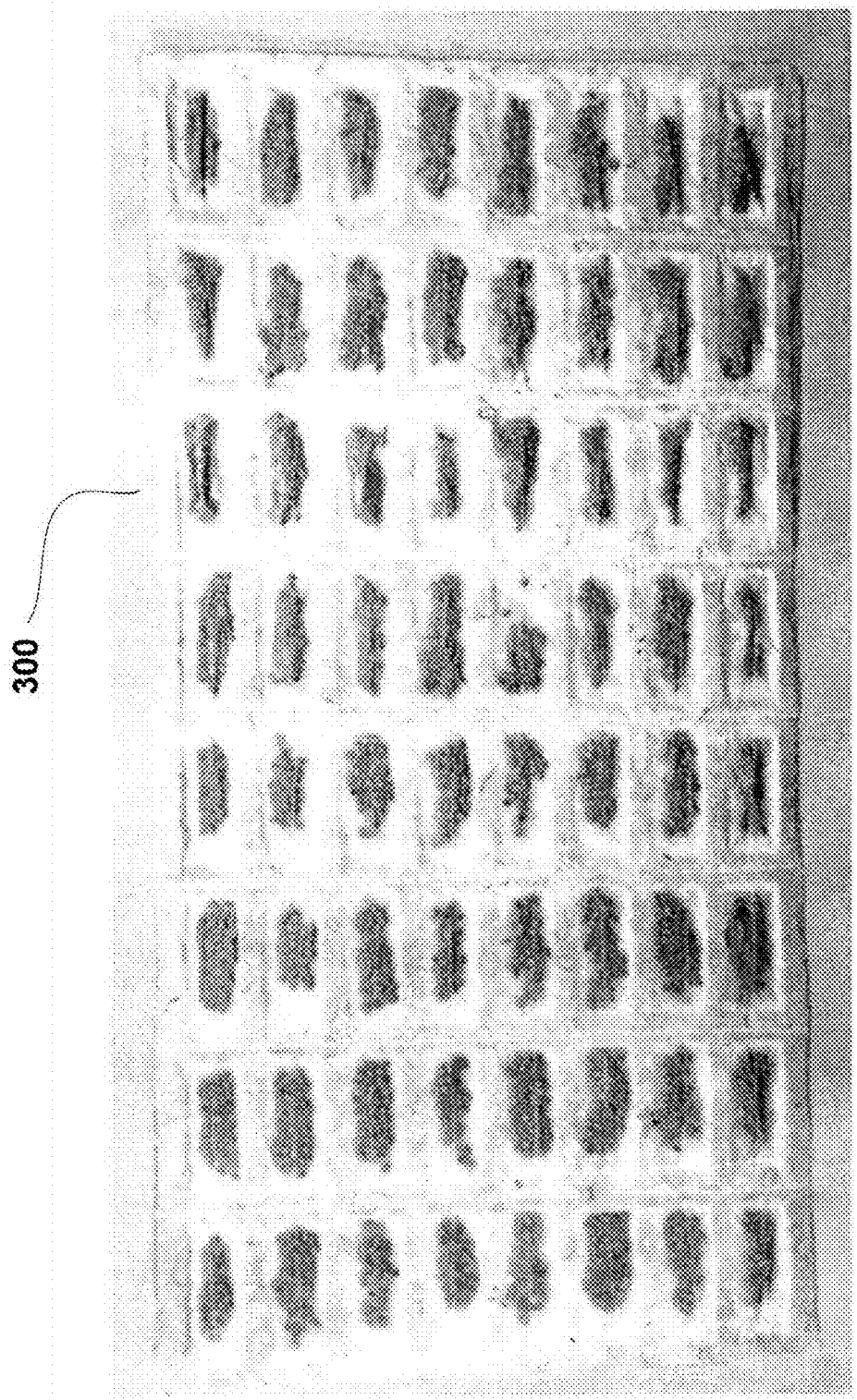
FIG. 20 includes a photograph of a seed quilt, according to various embodiments of the invention.

FIG. 20 includes a photograph of a seed quilt, according to various embodiments of the invention. This seed quilt includes sixty-four seed cells each including multiple seeds.

Figure 21:
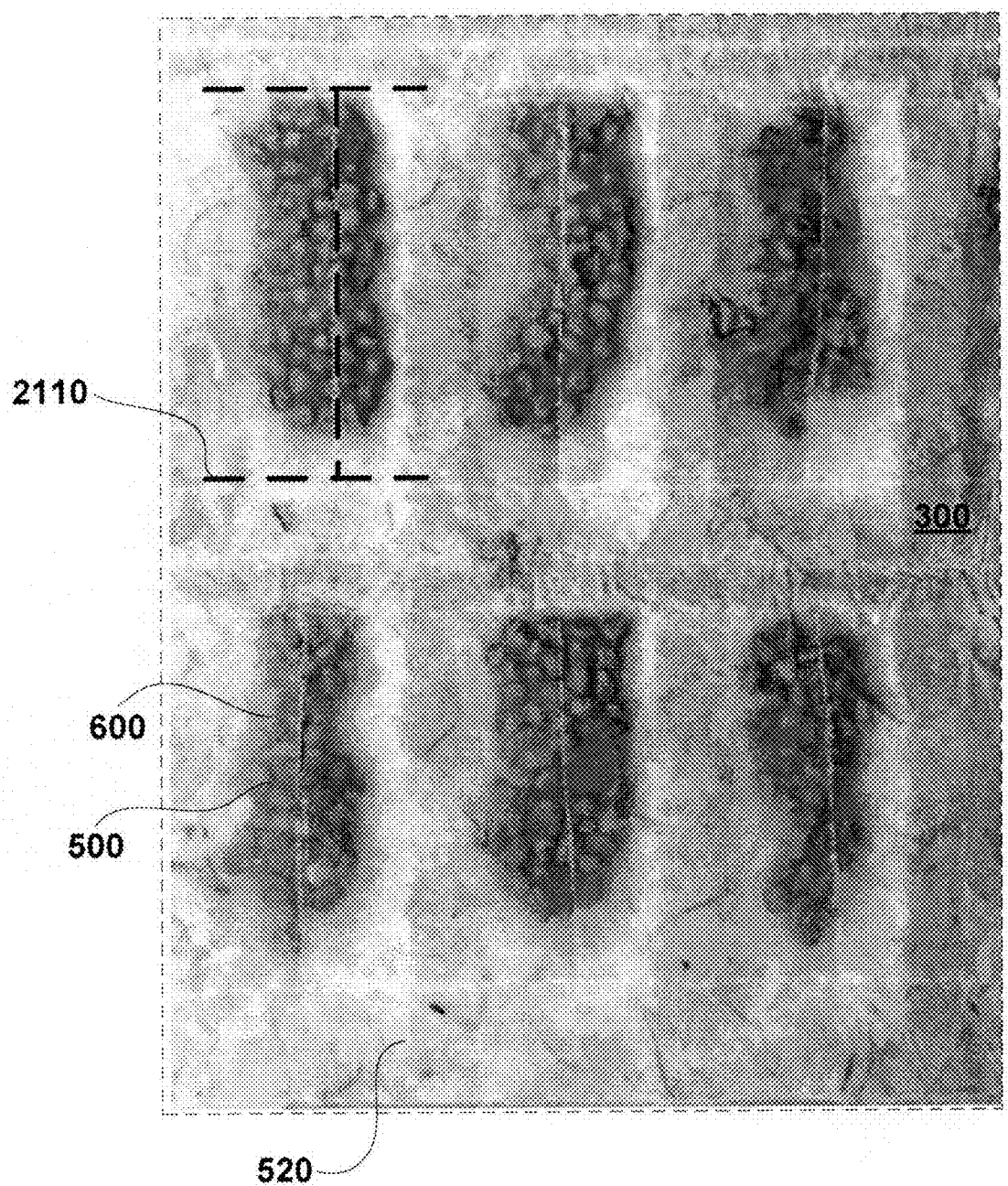
FIG. 21 includes a photograph showing part of a seed quilt including 6 seed cells, according to various embodiments of the invention.

FIG. 21 includes a photograph showing part of a seed quilt including 6 seed cells, according to various embodiments of the invention. These seed cells include perforations in an "H" pattern. The perforations are only faintly visible in the photograph as white lines, however, their location is illustrated for one seed cell by black dashed Hash Marks 2110. The perforations extend only through the Seed Cover 400.

Figure 22:
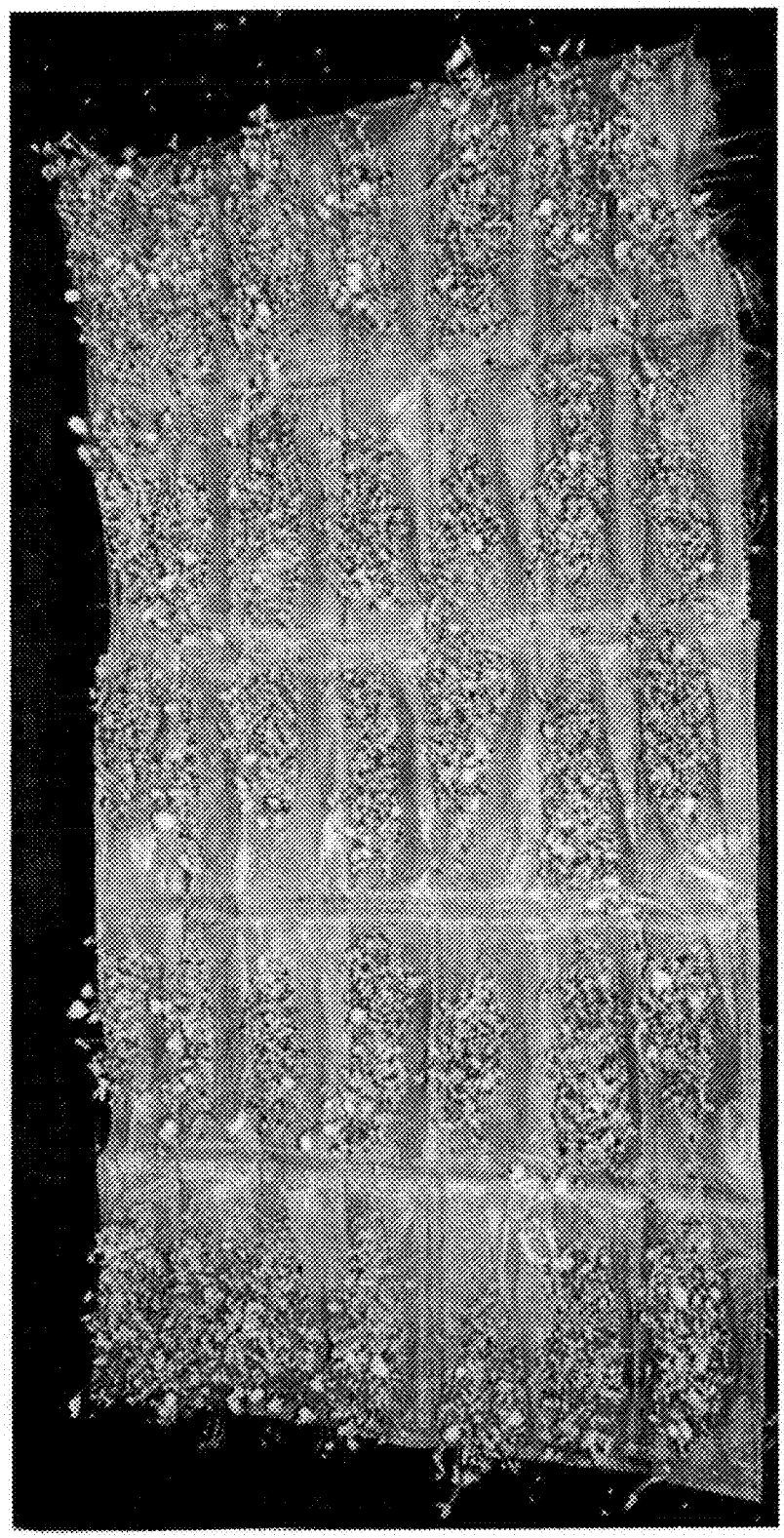
FIG. 22 includes a photograph of a seed quilt from which seeds have germinated, according to various embodiments of the invention.

FIG. 22 includes a photograph of a seed quilt from which seeds have germinated, according to various embodiments of the invention. The seed cells have broken open as a result of the growing sprouts and perforations such as those illustrated in FIG. 21.

Figure 23:
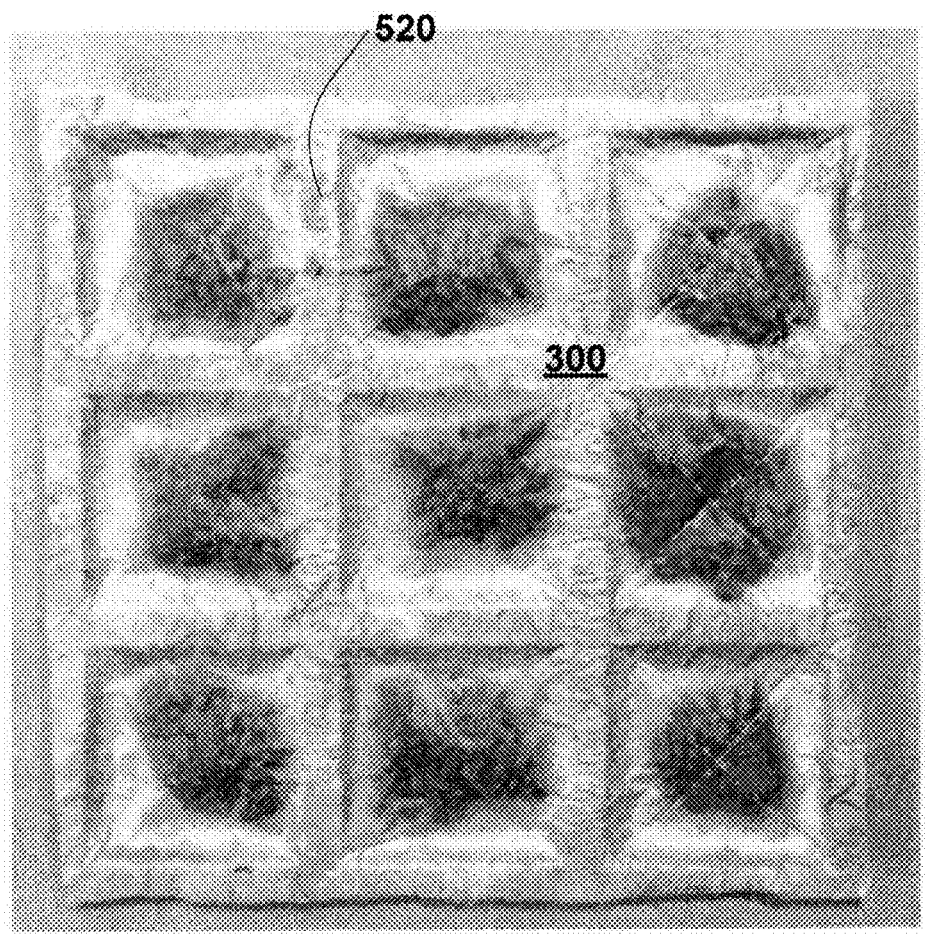
FIG. 23 includes a photograph of a seed quilt including nine square seed cells, according to various embodiments of the invention.

FIG. 23 includes a photograph of a seed quilt including nine square seed cells, according to various embodiments of the invention. The right column of seed cells are perforated in an "X" pattern as indicated while the left two columns of seed cells are not perforated. The perforations extend only through the Seed Cover 400.

Figure 24:
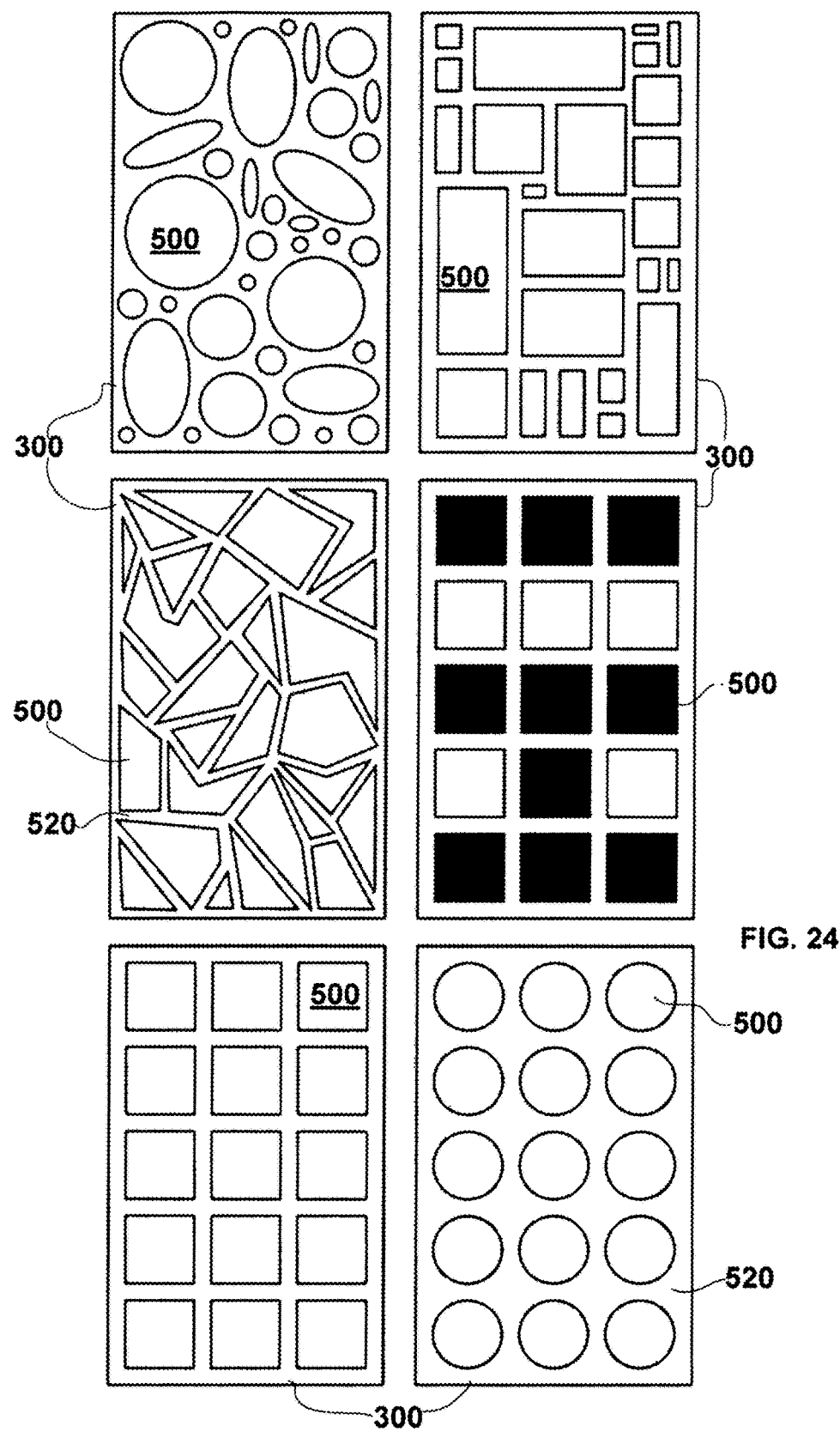
FIG. 24 illustrates a variety of different styles of seed cells in various seed quilts, according to various embodiments of the invention.

FIG. 24 illustrates a variety of different style/patterns of Seed Cells 500 in various seed quilts, according to various embodiments of the invention. Note that Seed Cells 500 can be disposed to form patterns diagrams and letters. In some embodiments, different types of seeds are placed in different seed cells to create multicolor designs, e.g., a heart shaped set of red sprouts in a field of green.

Figure 25:
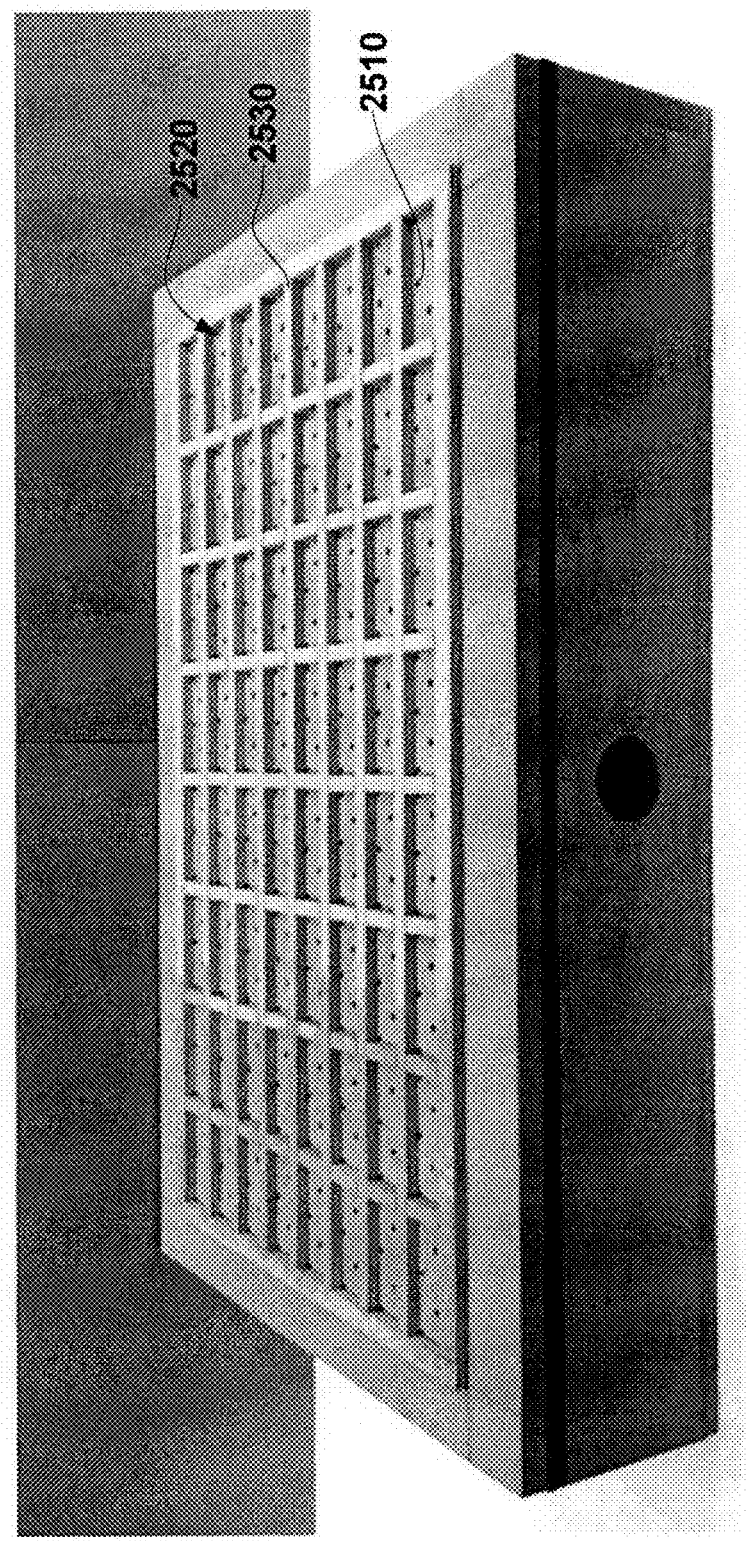
FIG. 25 illustrates a device for the production of seed quilts, according to various embodiments of the invention.

FIG. 25 illustrates a device for the production of seed quilts, according to various embodiments of the invention. This Device 2510 includes an array of Depressions 2520 and is configured to receive a Grow Substrate 800 or a Seed Cover 400. Once one of these layers is received, a vacuum is pulled on the depressions through holes 2510. This draws the material of the received layer into the depressions. Seeds 600 are optionally then added on top of the received layer where they will tend to collect within the depressions. A second layer, the complementary Seed Cover 400 or Grow Substrate 800, is then added on top of the Seeds 600 and the first layer. The two layers are then bonded together to create Bonded Regions 520 on the Ridges 2530 between the depressions. This process results in Seed Quilts 300 having Seed Cells 500 with extra volume in which the Seeds 600 can sprout.

Figure 26:
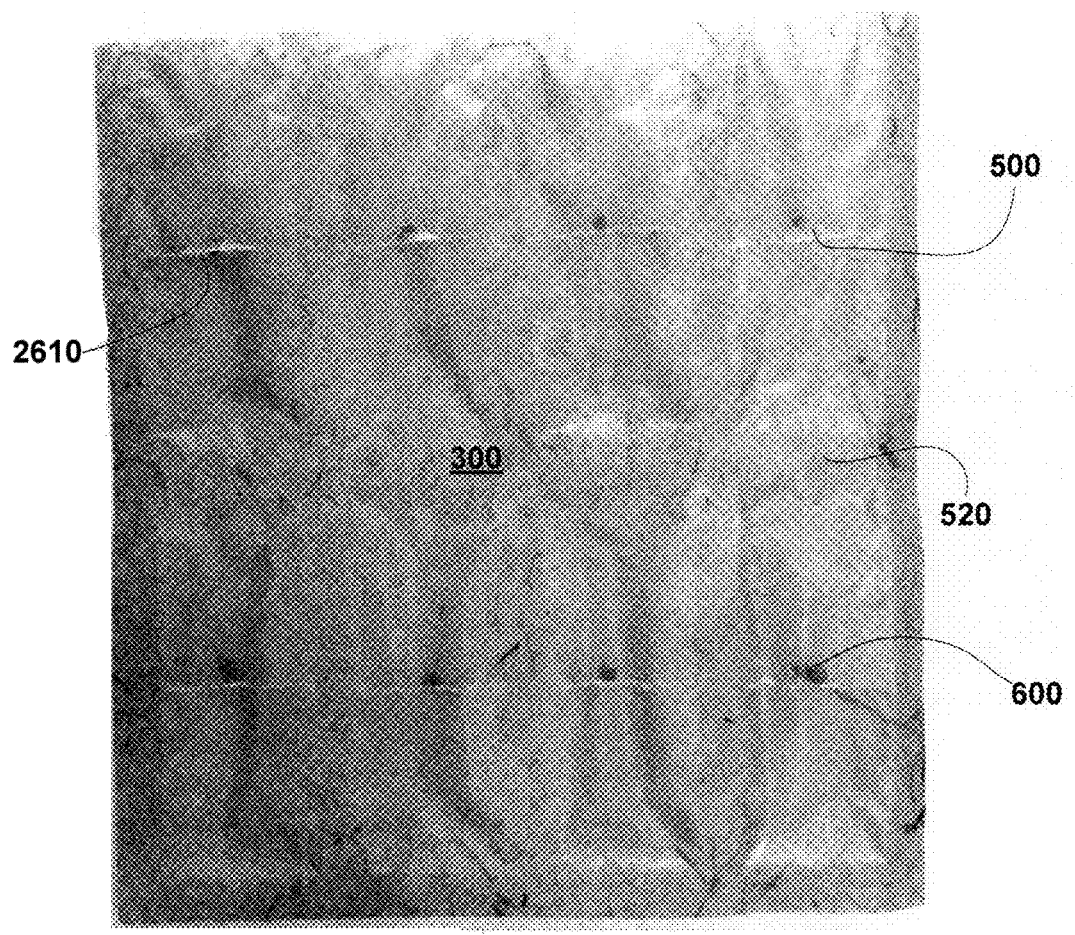
FIG. 26 illustrates a seed quilt including seeds inserted by an end user, according to various embodiment of the invention.

FIG. 26 is a photograph showing a seed quilt including Seeds 600 inserted by an end user, according to various embodiment of the invention. The user has inserted Seeds 600 into each Seed Cell 500 through the Seed Cell Slits 2610. The photograph shows a situation in which the user has decided to place 1-2 tomato Seeds 600 per seed cell 500. The user has slipped the seeds 600 into the Seed Cells 500 through the Seed Cell Slits 2610 and then pushed the Seeds 600 slightly further into the Seed Cells 500 such that they are situated under the Seed Cover 400. The Bonding Region 520 surrounding the Seed Cells 500 is shown in the photograph.

Figures 27A, 27B:
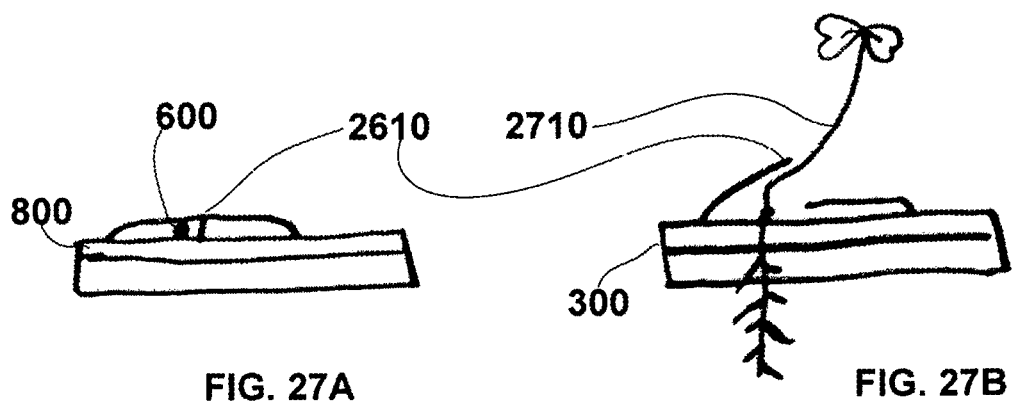
FIGS. 27a and 27b illustrate germination of a seed, according to various embodiments of the invention.

FIGS. 27a and 27b illustrate germination of a seed, according to various embodiments of the invention. Shown is a Seed Quilt 300 before growing (FIG. 27a) and after growing (FIG. 27b). In FIG. 27a, a blank Seed Quilt 300 is shown. A user has already inserted a Seed 600 into the Seed Cell 500 through the Seed Cell Slit 2610. The Seed Cover 400 makes up the upper layer of the blank Seed Quilt 300 and the top of the Seed Cell 500. The Grow Substrate 800 is the bottom layer of the blank Seed Quilt 300. In FIG. 27b, a blank Seed Quilt 300 that has accomplished germinating and sprouting a seedling is shown. The Seed 600 germinated, sending Roots 900 downward into the Grow Substrate 800. The nature of the root growth depends on the irrigation system in which the blank seed quilt has been planted. The Roots 900 could stay within the boundaries of the Grow Substrate 800 or surpass below the Grow Substrate 800 into other materials, water, or air. The Plant Stem 2710 is shown, having pushed against the Seed Cover 400 of the Seed Cell 500 and exited the Seed Cell 500 through the Seed Cell Slit 2610. This is one of many potential exit behaviors of the Plant Stem 2710 from the Seed Cell 500.

Several embodiments are specifically illustrated and/or described herein. However, it will be appreciated that modifications and variations are covered by the above teachings and within the scope of the appended claims without departing from the spirit and intended scope thereof. For example, some embodiments of Seed Quilts 300 are configured for use at large scales, e.g., for commercial farming or erosion control. When used outdoors, Seed Quilts 300 protect seeds from animals and provide a good growing environment on unstable or difficult soils. Such applications may use larger sizes of Seed Cell 500, relative to those discussed above. Outdoor applications such as erosion control may require a Seed Quilt 300 configured to break down within a certain timeframe after it has fulfilled its purpose. The Seed Quilt 300, namely the Grow Substrate 800, can be designed to break down by bacterial or chemical additives that are introduced during manufacturing of the Seed Quilt 300 or applied in situ at any time. While the Seed Quilts 300 illustrated herein are configured for growing microgreens, in alternative embodiments Seed Quilts 300 can be configured for growing other biological materials including other plant types, plant clones, seaweed and fungi. For example, Seed Quilts 300 are optionally inoculated with mushroom spores rather than including seeds.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A seed quilt comprising:
   a grow substrate;
   a seed cover, the seed cover comprising a different material than the grow substrate;
   seeds; and
   bonding regions at which the grow substrate is attached to the seed cover and configured to form one or more seed cells in which one or more of the seeds are contained, the one or more seed cells having sufficient space for the seeds to germinate and sprout, wherein the bonding regions are configured such that the grow substrate and the seed cover separate as the seeds germinate, separation at the bonding regions being caused by a force of the germinating seeds.

2. The quilt of claim 1, wherein the one or more seed cells each include more than one of the seeds.

3. The quilt of claim 1, wherein the bonding regions are configured to form at least 4 seed cells.

4. The quilt of claim 1, wherein the seed cover includes perforations or slits.

5. The quilt of claim 1, wherein the seeds are of more than one type of plant.

6. The quilt of claim 1, wherein the one or more seed cells each have an area of at least ½ square inch.

7. The quilt of claim 1, wherein the one or more seed cells each have an area of at least 1 square inch.

8. The quilt of claim 1, wherein the seed cover is configured to retain moisture within the one or more seed cells and to shield the seeds from light.

9. The quilt of claim 1, wherein the seed cover is configured to break in response to pressure exerted by the growing sprouts.

10. The quilt of claim 1, wherein the bonding regions are configured for the one or more seed cells to merge as a result of the seed germination.

11. The quilt of claim 1, wherein the bonding regions are formed using a thermal bonding process.

12. A seed quilt comprising:
    seeds disposed within seed cells;
    a grow substrate configured to face a water source and to control transport of moisture to the seed cells;
    a seed cover configured to be oriented so as to be exposed to light and to control transport of moisture from the seed cells; and
    bonding regions at which the grow substrate is attached to the seed cover and configured to form one or more of the seed cells in which one or more of the seeds are contained, the seed cells having sufficient space for the seeds to germinate and sprout, wherein the one or more seed cells are configured to merge as the seeds grow, the merger being caused by force of the germinating seeds on the seed cells.

13. The quilt of claim 12, wherein the seeds are of more than one type of plant.

14. The quilt of claim 12, wherein the one or more seed cells each have an area of at least ½ square inch.

15. The quilt of claim 12, wherein the one or more seed cells each have an area of at least 1 square inch.

16. The quilt of claim 12, wherein the seed cover is configured to retain moisture within the one or more seed cells and to shield the seeds from light.

17. A seed quilt comprising:
    a grow substrate;
    a seed cover, the seed cover comprising a hydrophobic material;
    seeds; and
    bonding regions at which the grow substrate is attached to the seed cover and configured to form one or more seed cells in which one or more of the seeds are contained, the one or more seed cells having sufficient space for the seeds to germinate and sprout, wherein the bonding regions are configured such that the grow substrate and the seed cover separate as the seeds sprout, the separation being caused by a force of the germinating seeds, and the one or more seed cells are configured to merge as the seeds sprout.

18. The quilt of claim 17, wherein the seeds are of more than one type of plant.

19. The quilt of claim 17, wherein the seed cover is configured to retain moisture within the one or more seed cells and to shield the seeds from light.

20. The quilt of claim 17, wherein the bonding regions are formed using a thermal bonding process.

* * * * *